(12) United States Patent
Ishikawa et al.

(10) Patent No.: US 10,189,720 B2
(45) Date of Patent: Jan. 29, 2019

(54) WATER PURIFYING CARTRIDGE AND PITCHER-TYPE WATER PURIFIER

(75) Inventors: Takeshi Ishikawa, Tokyo (JP);
Shouzou Kimura, Tokyo (JP);
Hatsumi Takeda, Toyohashi (JP)

(73) Assignee: Mitsubishi Rayon Cleansui Company, Limited, Tokyo (JP)

( * ) Notice: Subject to any disclaimer, the term of this patent is extended or adjusted under 35 U.S.C. 154(b) by 0 days.

(21) Appl. No.: 13/983,851

(22) PCT Filed: Feb. 9, 2012

(86) PCT No.: PCT/JP2012/052956
§ 371 (c)(1),
(2), (4) Date: Sep. 6, 2013

(87) PCT Pub. No.: WO2012/108496
PCT Pub. Date: Aug. 16, 2012

(65) Prior Publication Data
US 2014/0008276 A1    Jan. 9, 2014

(30) Foreign Application Priority Data

Feb. 9, 2011  (JP) ................................. 2011-026234
Feb. 9, 2011  (JP) ................................. 2011-026235
(Continued)

(51) Int. Cl.
*B01D 35/00*   (2006.01)
*C02F 1/00*    (2006.01)
(Continued)

(52) U.S. Cl.
CPC .............. *C02F 1/003* (2013.01); *B01D 61/08* (2013.01); *B01D 61/18* (2013.01); *B01D 63/02* (2013.01);
(Continued)

(58) Field of Classification Search
None
See application file for complete search history.

(56) References Cited

U.S. PATENT DOCUMENTS 3,970,492 A * 7/1976 Amberg et al. .................. 156/85
3,997,082 A * 12/1976 Tucker, Jr. .................... 222/108
(Continued)

FOREIGN PATENT DOCUMENTS

CN    1551856 A    12/2004
CN    2836894 Y    11/2006
(Continued)

OTHER PUBLICATIONS

MatWeb: Material Property Data; Styron magnum 2645 ABS, Impact Grade; Material Notes; http://www.matweb.com/search/datasheettext.aspx?matguid=916b78914b934f45a80e2307c0df5e23.*
(Continued)

*Primary Examiner* — Richard C Gurtowski
(74) *Attorney, Agent, or Firm* — Morgan, Lewis & Bockius LLP

(57) ABSTRACT

The present invention relates to a pitcher-type water purifier, comprising: a pitcher body including a cylindrical casing having a bottom and a partition for partitioning the inside of the casing; a pitcher lid liquid-tightly closing an opened top end of the pitcher body; and a water purifying cartridge detachably attached to an opened attachment part in the partition.

5 Claims, 17 Drawing Sheets

(30) Foreign Application Priority Data

Feb. 9, 2011 (JP) ................................. 2011-026236
Feb. 9, 2011 (JP) ................................. 2011-026237

(51) Int. Cl.

| | |
|---|---|
| *B01D 61/08* | (2006.01) |
| *B01D 61/18* | (2006.01) |
| *B01D 63/02* | (2006.01) |
| *C02F 1/28* | (2006.01) |
| *C02F 1/44* | (2006.01) |

(52) U.S. Cl.

CPC .......... *B01D 2313/40* (2013.01); *C02F 1/281* (2013.01); *C02F 1/283* (2013.01); *C02F 1/444* (2013.01); *C02F 2201/003* (2013.01); *C02F 2201/004* (2013.01); *C02F 2201/006* (2013.01); *C02F 2201/007* (2013.01); *C02F 2209/445* (2013.01); *C02F 2307/04* (2013.01)

(56) References Cited

U.S. PATENT DOCUMENTS

| | | | | |
|---|---|---|---|---|
| 4,605,134 | A | * 8/1986 | Zimmermann | ......... A47J 41/02 215/13.1 |
| 5,447,259 | A | * 9/1995 | Erickson | .................. A45F 5/10 220/759 |
| 5,637,214 | A | * 6/1997 | Kahana | ......................... 210/282 |
| 6,086,240 | A | 7/2000 | Murphy | |
| 6,767,453 | B2 | * 7/2004 | Lifschitz | ......................... 210/85 |
| 6,841,067 | B1 | 1/2005 | Hofmann et al. | |
| 2008/0023406 | A1 | 1/2008 | Rawson et al. | |

FOREIGN PATENT DOCUMENTS

| | | |
|---|---|---|
| CN | 101439886 A | 5/2009 |
| EA | 004021 B1 | 12/2003 |
| EP | 0 788 397 A1 | 8/1997 |
| EP | 0 992 458 A2 | 4/2000 |
| EP | 1 354 857 A1 | 10/2003 |
| EP | 1 728 767 A1 | 12/2006 |
| JP | 61-130396 U | 8/1986 |
| JP | 06-007770 | 1/1994 |
| JP | H7-9482 U | 2/1995 |
| JP | 07-313966 | 12/1995 |
| JP | 11-207320 A | 8/1999 |
| JP | 2001-502596 A | 2/2001 |
| JP | 2003-514647 A | 4/2003 |
| JP | 2003260459 A | 9/2003 |
| JP | 2004-114036 A | 4/2004 |
| JP | 2006-51428 A | 2/2006 |
| JP | 4157378 B | 7/2008 |
| JP | 1354097 S | 3/2009 |
| JP | 2009132421 A | 6/2009 |
| JP | 3155684 U | 11/2009 |
| JP | 2010-115612 A | 5/2010 |
| JP | 2010-162541 A | 7/2010 |
| JP | 2011-083680 A | 4/2011 |
| RU | 225 U1 | 1/1995 |
| RU | 2076846 C1 | 4/1997 |
| RU | 10711 U1 | 8/1999 |
| RU | 2241522 C2 | 12/2004 |
| RU | 70150 C1 | 1/2008 |
| RU | 2 353 419 C2 | 2/2008 |
| RU | 2 342 325 C2 | 12/2008 |
| RU | 2 353 419 C2 | 4/2009 |
| RU | 2387590 C2 | 4/2010 |
| WO | 96/13318 A1 | 5/1996 |
| WO | 98/17582 A1 | 4/1998 |
| WO | 2006/000774 A1 | 1/2006 |
| WO | 2010082422 A1 | 7/2010 |

OTHER PUBLICATIONS

Notification (Information Statement) in Japanese Patent Application No. 2013-223612 with partial English translation dated Jun. 26, 2014.
International Search Report dated Apr. 17, 2012 for International application No. PCT/JP2012/052956.
Chinese Office Action dated Apr. 17, 2013 for Application No. 201210028579.3.
Russian Office Action dated Dec. 11, 2014 for related Russian Application No. 2013 140171 (061089) with English translation (8 pages).
Notification issued in Japanese Application No. 2012-512096 dated Feb. 24, 2015.
European Search Report issued in European Application No. 12744593.0 dated Mar. 5, 2015.
Russian Office Action issued in Russian Patent Application No. 2013140171 dated Jan. 15, 2016.
Japanese Office Action issued in Japanese Patent Application No. 2013-223549 dated Jan. 5, 2016.
Decision on Grant in corresponding Russian Application No. 2013140171 dated Jan. 30, 2017 with English translation of same (14 pages).
Notice of Allowance issued in Japanese Patent Application No. 2013-223549 dated Aug. 30, 2016.
Office Action dated Jan. 13, 2014 in corresponding Chinese Application No. 201280008341.2 and English translation of same.
Office Action dated Aug. 7, 2018 in corresponding European Application No. 12 744 593.0.

* cited by examiner

WATER PURIFYING CARTRIDGE AND PITCHER-TYPE WATER PURIFIER

TECHNICAL FIELD

The present invention relates to a pitcher-type water purifier which purifies tap water or the like to store the purified tap water and a water purifying cartridge suitable for use in the pitcher-type water purifier. This application claims priority based on Japanese Patent Application Nos. 2011-026234, 2011-026235, 2011-026236, and 2011-026237 filed on Feb. 9, 2011, which are incorporated herein by reference.

BACKGROUND ART

A pitcher-type water purifier which purifies water to be treated such as tap water and stores the obtained purified water has been known. As such pitcher-type water purifier, there has been known to include a pitcher body, a pitcher lid for closing a top opening of the pitcher body, and a water purifying cartridge detachably attached into the pitcher body (see Patent Documents 1 and 2).

It is configured so that a purified water outlet (purified water spout) is formed in a purified water storage part to pour the purified water from the purified water outlet.

The pitcher body includes a casing, and the inside of the casing is partitioned into a raw water reservoir to which a water to be treated is supplied and a purified water reservoir which stores the purified water after treatment by a partition. It is configured so that a mounting hole is opened in the partition, and the water purifying cartridge is detachably mounted to the mounting hole. With this configuration, the water to be treated which is supplied to the raw water reservoir is treated with the water purifying cartridge and the obtained purified water is stored in the purified water reservoir.

For example, the casing of the pitcher-type water purifier is integrally molded in a form of container by a method of injection-molding a transparent resin such as an AS resin (acrylonitrile-styrene copolymer).

Further, as this pitcher-type water purifier, there is the pitcher-type water purifier provided so as to display an exchange time of the water purifying cartridge on the pitcher lid. Specifically, there is the pitcher-type water purifier provided so that the numbers 1, 2, . . . , and 12 indicating January to December are disposed in an annular shape on a lid body of the pitcher lid and that a rotatable dial board is covered thereon. A window is formed in the dial board to display the numbers, for example, "4, 5, and 6" on the window as a user appropriately rotates the dial board. Here, "4, 5, and 6" refer to three months of "April, May, and June" and means that the water purifying cartridge is mounted on April and it is optimal to exchange the water purifying cartridge on June in terms of a life-span.

A claw is provided at a center of a rear surface of the dial board in related art, and the dial board is attached by fitting into an attachment hole opened in the lid body. Therefore, it is possible to easily remove the dial board by pushing the claw from a rear side of the lid body. For example, when a dirty substance adheres on the dial board, the user removes and cleans the dial board using the above described manner.

Meanwhile, in recent year, the pitcher lid capable of liquid-tightly closing the pitcher body is provided, so that a pitcher-type water purifier of transversely-mounted correspondence type, which can transversely be mounted in a refrigerator or the like, has been developed.

As the water purifying cartridge, for example, as illustrated in FIGS. 15A, 15B, and 16, there is a water purifying cartridge including a cylindrical housing body 4110 in which a water purification material 4113 is received, a discharging hole 4114 for discharging the purified water is formed at a bottom, and a top end is opened and a housing lid 4120 for closing the top end of the housing body 4110. In the housing lid 4120 of this example, a lower end is an opened-cylindrical shape, intake holes 4121a and 4121b of two vertical rows is formed on a periphery wall to intake the water to be treated inside the water purifying cartridge 4100. As the water purification material 4113, a hollow fiber film module 4112 and an adsorbing material 4111 such as an activated carbon, which is filled in an upstream side of the hollow fiber film module 4112 are received.

In the case of manufacturing the water purifying cartridge 4100, first, the hollow fiber film module 4112 is received and fixed to the housing body 4110. Next, the adsorbing material 4111 is charged and filled from the top end of the housing body 4110. After the adsorbing material 4111 is filled into the housing body 4110, a housing lid 4120 is covered on the top end of the housing body 4110, and the housing body 4110 and the housing lid 4120 are ultrasonically welded by radiating ultrasonic waves using a ultrasonic transmitter applied to a flange 4122 formed in the housing lid 4120. Moreover, after the hollow fiber film module is fixed, a partition plate (not illustrated) is disposed, and then the absorbing material may be charged.

Within the water purifying cartridge 4100, an inner space of the housing lid 4120 formed with the intake holes 4121a and 4121b becomes an air storage unit 4123. An air discharge hole 4124 which allows the inside and the outside to communicate with each other is formed at the top of the housing lid 4120 together with the formation of the air storage unit 4123, and thus the water to be treated intakes more smoothly into the water purifying cartridge 4100 from the intake holes 4121a and 4121b.

In the water purifying cartridge 4100 of this example, it is required to reduce a dead space within the water purifying cartridge 4100 and to fill a volume of adsorbing material 4111 as much as possible. However, when the adsorbing material 4111 is voluminously filled, since the above-described air storage unit 4123 is not formed, it is preferable that the adsorbing material 4111 be filled to an any height between the upper intake hole 4121a and the lower intake hole 4121b.

CITATION LIST

Patent Document

Patent Document 1: English translation: Japanese Unexamined Patent Application Publication No. 2001-502596
Patent Document 2: English translation: Japanese Unexamined Patent Application Publication No. JP 2003-514647

DISCLOSURE OF THE INVENTION

Problem to be Solved by the Invention

However, in the casing of the above-described pitcher-type water purifier, particularly, the lower part of the casing is likely to collide with a door pocket or the like by taking the refrigerator in and out. For this reason, it is required to improve impact resistance of the bottom.

Further, in the case of injection-forming the casing, it is necessary to de-mold after molding. Therefore, the shape of the casing is restricted to a good de-molding property, and thus the degree of freedom of the shape is low.

Further, with respect to the lid body and the dial board configured as in related arts, since there is no liquid-tightness between the claw of the dial board and the attachment hole, the lid body and the dial board could not have been provided in the pitcher-type water purifier of the transversely-mounted correspondence type.

In addition, with respect to the pitcher-type water purifier of the transversely-mounted correspondence type, there are many cases that the pitcher lid is a screw type for liquid-tightly closing the top end of the pitcher body by a threaded engagement, and it is necessary that both of a transverse section of the pitcher lid and a transverse section of the top end of the casing are a circular shape. In the case in which the transverse section is a circular shape over from the top end to the lower end, if the user intends to increase the capacity of the casing, since the diameter thereof is inevitably made larger, the problem in which the pitcher-type water purifier does not fit into the door pocket of the refrigerator arises. In addition, even in the case of the pitcher lid not having the liquid-tightness property, a similar problem arises when the transverse section of the casing is the circular over from the top end to the lower end. Further, when the pitcher lid is the screw type, if the diameter is too large, the problem in which it is difficult that the user grips pitcher lid to tighten or loosen also arises.

Further, in the case of the above-described water purifying cartridge 4100, since the adsorbing material 4111 is charged from the top end of the housing body 4110, the adsorbing material 4111 is filled only up to the top end of the housing body 4110. In addition, practically, although the user intends to fill the adsorbing material 4111 up to the top end of the housing body 4110, the adsorbing material 4111 spills or overflows from the housing body 4110. Therefore, in practice, as illustrated in FIG. 15B, the adsorbing material 4111 can be filled only up to a position $P_1$ lower than the top end of the housing body 4110.

As described above, in the water purifying cartridge 4100 of the related art, a portion from the position $P_1$ to about between the upper intake hole 4121a and the lower intake hole 4121b is a dead space Ds in which the water purification material 4113 is not received, and thus a filling efficiency of the water purification material with respect to an inner volume of the water purifying cartridge was bad.

In addition, with respect to the water purifying cartridge, it is required to improve a filtration rate without changing an outer shape or a size of the cartridge from a viewpoint of compatibility. In order to improve the filtration rate, when the water purification material is provided with the hollow fiber film, it is effective to increase a film area by increasing a receiving capacity of the hollow fiber film. However, when receiving capacity of the hollow fiber film is increased, the space on which the absorbing material is filled is further reduced. Even from this viewpoint, it is required to reduce the dead space as much as possible.

The present invention has been made in view of the above circumstances and is an object to provide the pitcher-type water purifier which is capable of increasing the impact resistance of the bottom of the casing and in which the degree of freedom in shape design of the casing is high.

In addition, the present invention has been made in view of the above circumstances and is an object to provide the pitcher-type water purifier capable of mounting transversely to also remove the dial board.

In addition, the present invention has been made in view of the above circumstances and is an object to provide the pitcher-type water purifier which is also superior in storability so that the capacity is increased while the transverse section of the top end of the casing is an approximately circular shape.

Further, the present invention has been made in view of the above circumstances and is an object to provide the water purifying cartridge in which the charging efficiency of the water purification material for volume of the water purifying cartridge is good and the pitcher-type water purifier including the water purifying cartridge.

Means for Solving Problem

The present invention has following aspects.

A first aspect of the present invention is a pitcher-type water purifier, including a pitcher body provided with a cylindrical casing having a bottom and a partition for partitioning the inside of the casing, a pitcher lid liquid-tightly closing an opened top end of the pitcher body, and a water purifying cartridge detachably attached to an opened attachment part in the partition.

A second aspect of the present invention is the pitcher-type water purifier according to the first aspect, wherein in the casing, the bottom and a peripheral wall are formed as separate bodies and the bottom is formed with a resin having an Izod impact strength in the range of 50 to 1200 (J/m).

A third aspect of the present invention is the pitcher-type water purifier according to the first or second aspect, wherein the resin is an ABS resin.

A fourth aspect of the present invention is the pitcher-type water purifier according to any one of the first to third aspects, wherein the pitcher lid liquid-tightly closes the top end.

A fifth aspect of the present invention is the pitcher-type water purifier according to the first aspect, wherein the pitcher lid includes a lid body in which a plurality of marks is disposed in an annular shape on the top surface and a pivotable dial board which is provided on the plurality of marks and selectively displays some of the plurality of marks from a window, and a claw is stood up on the top surface of the lid body, a cylindrical projection is formed on a rear surface of the dial board, and the claw fits into the projection so that the dial board is detachably attached.

A sixth aspect of the present invention is the pitcher-type water purifier according to the fifth aspect, wherein a concave is formed on the top surface of the lid body, and the dial board is drawn upward by using the window as a starting point while the concave and the window match each other by pivoting the dial board to remove the dial board from the lid body.

A seventh aspect of the present invention is the pitcher-type water purifier according to the first aspect, wherein the casing is formed in a shape continuously transformed downward from the upper side while a transverse section of a top end is an approximately circular shape and the bottom is a quadrangular shape.

An eighth aspect of the present invention is the pitcher-type water purifier according to the seventh aspect, wherein a diameter-reduced neck is formed on the peripheral wall of the casing.

A ninth aspect of the present invention is the pitcher-type water purifier according to the seventh or eighth aspect, wherein a fitting portion of the casing and the pitcher lid is a circular shape.

A tenth aspect of the present invention is a water purifying cartridge, including a water purification material for treating water to be treated, a housing body in which the water purification material is directly received, a discharge hole discharging purified water is formed at a bottom, and a top end is opened, and a housing lid provided at the top end of the housing body.

A eleventh aspect of the present invention is the water purifying cartridge according to the tenth aspect, wherein an intake hole for taking the water to be treated is formed on a peripheral wall of the housing body.

A twelfth aspect of the present invention is the water purifying cartridge according to the tenth or eleventh, wherein in the water purification material, a powdery or granular adsorbing material is provided at least at the uppermost stream side.

A thirteenth aspect of the present invention is a pitcher-type water purifier including the water purifying cartridge according to any one of the tenth to twelfth.

A fourteenth aspect of the present invention is a pitcher-type water purifier, including a cylindrical casing having a bottom, a pitcher body including a partition that partitions the inside of the casing, a pitcher lid liquid-tightly closing an opened top end of the pitcher body, and the water purifying cartridge according to any one of the tenth to thirteenth 10 to 13 detachably attached to an opened attachment part in the partition.

Another preferable aspect of the present invention is characterized in that the pitcher-type water purifier of the present invention includes a pitcher body including a cylindrical casing having a bottom and a partition for partitioning the inside of the casing, a pitcher lid liquid-tightly closing an opened top end of the pitcher body, and a water purifying cartridge detachably attached to an opened attachment part in the partition, and in the casing, the bottom and a peripheral wall are formed as separate bodies.

It is preferable that the pitcher lid liquid-tightly close the top end.

Further, in the pitcher-type water purifier according to the fifth or sixth aspect, it is preferable that the mark indicate at least an exchange time of the water purifying cartridge.

It is preferable that the mark indicate at least an exchange time of the water purifying cartridge.

Further another preferable aspect of the present invention is a pitcher-type water purifier, including a pitcher body provided with a cylindrical casing having a bottom and a partition for partitioning the inside of the casing, a pitcher lid liquid-tightly closing an opened top end of the pitcher body, and a water purifying cartridge detachably attached to an opened attachment part in the partition, and the casing is formed in a shape continuously transformed downward from the upper side while a transverse section of a top end is an approximately circular shape and the bottom is a quadrangular shape.

It is preferable that a diameter-reduced neck be formed on the peripheral wall of the casing.

Further another preferable aspect of the present invention is a water purifying cartridge, including a water purification material for treating water to be treated, a housing body in which the water purification material is received, a discharge hole discharging purified water is formed at a bottom, and a top end is opened, and a housing lid provided at the top end of the housing body, and an intake hole for taking the water to be treated is formed on a peripheral wall of the housing body.

The water purifying cartridge of the present invention is particularly effective in the case in which a powdery or granular adsorbing material is provided at least at the uppermost stream side of the water purification material.

The pitcher-type water purifier is characterized by including the water purifying cartridge of the present invention.

Effect of the Invention

According to the present invention, it may provide a pitcher-type water purifier which is capable of increasing impact resistance of a bottom of a casing and in which the degree of freedom in shape design of the casing is high.

In addition, according to the present invention, it may provide a pitcher-type water purifier capable of supporting transversely to also remove a dial board.

In addition, according to the present invention, since the capacity is increased while a transverse section of a top end of the casing is an approximately circular shape, it may provide a pitcher-type water purifier which is also superior in storability.

Further, according to the present invention, it may provide a water purifying cartridge in which the filling efficiency of water purification material for volume of the water purifying cartridge is good and a pitcher-type water purifier including the water purifying cartridge.

BEST MODE(S) FOR CARRYING OUT THE INVENTION

Hereinafter, the present invention will be described in detail.

Figure 1:
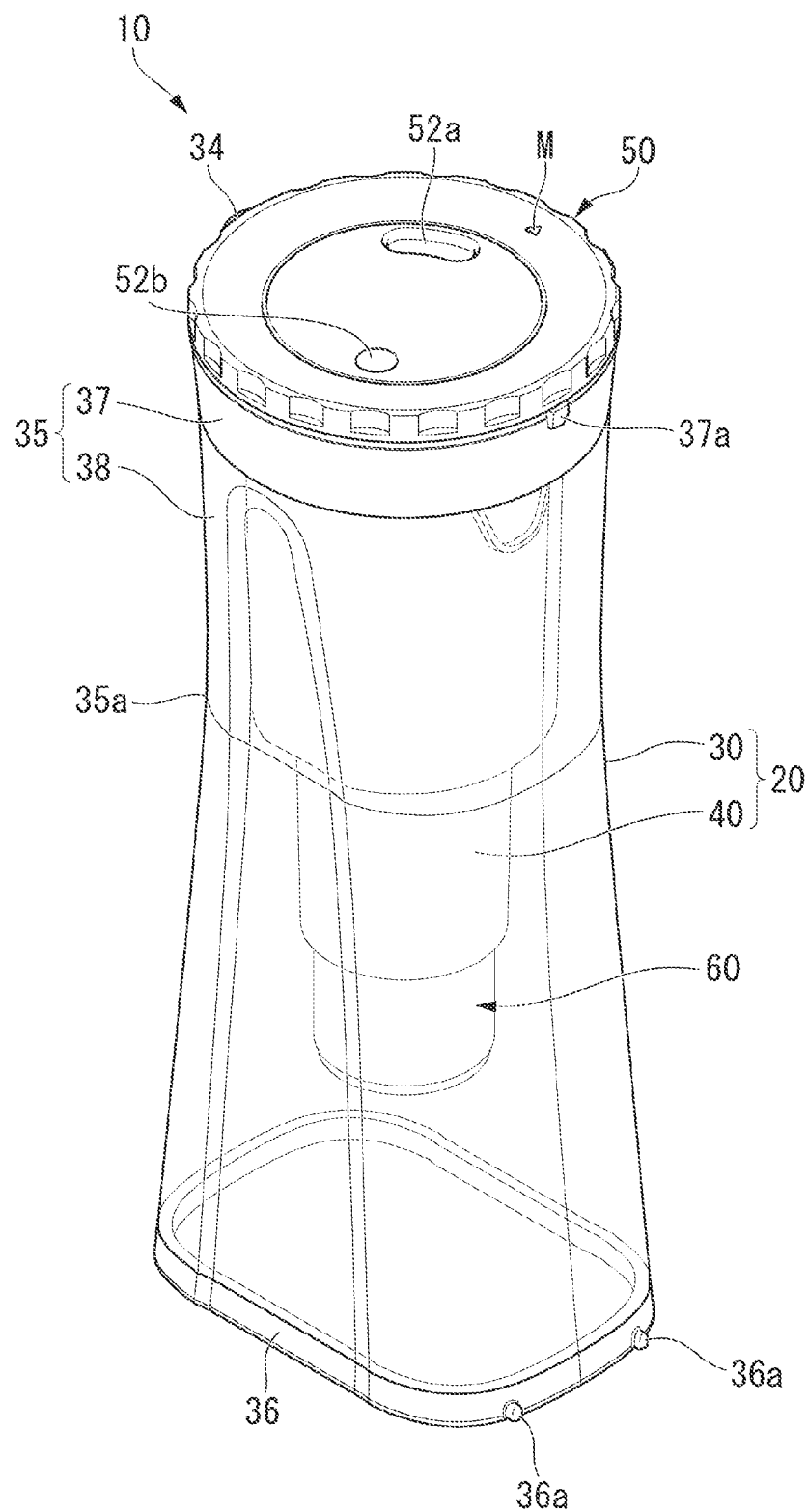
FIG. 1 is a diagram illustrating one example of a pitcher-type water purifier of the present invention and a perspective view of the pitcher-type water purifier which is vertically disposed.
Figure 2:
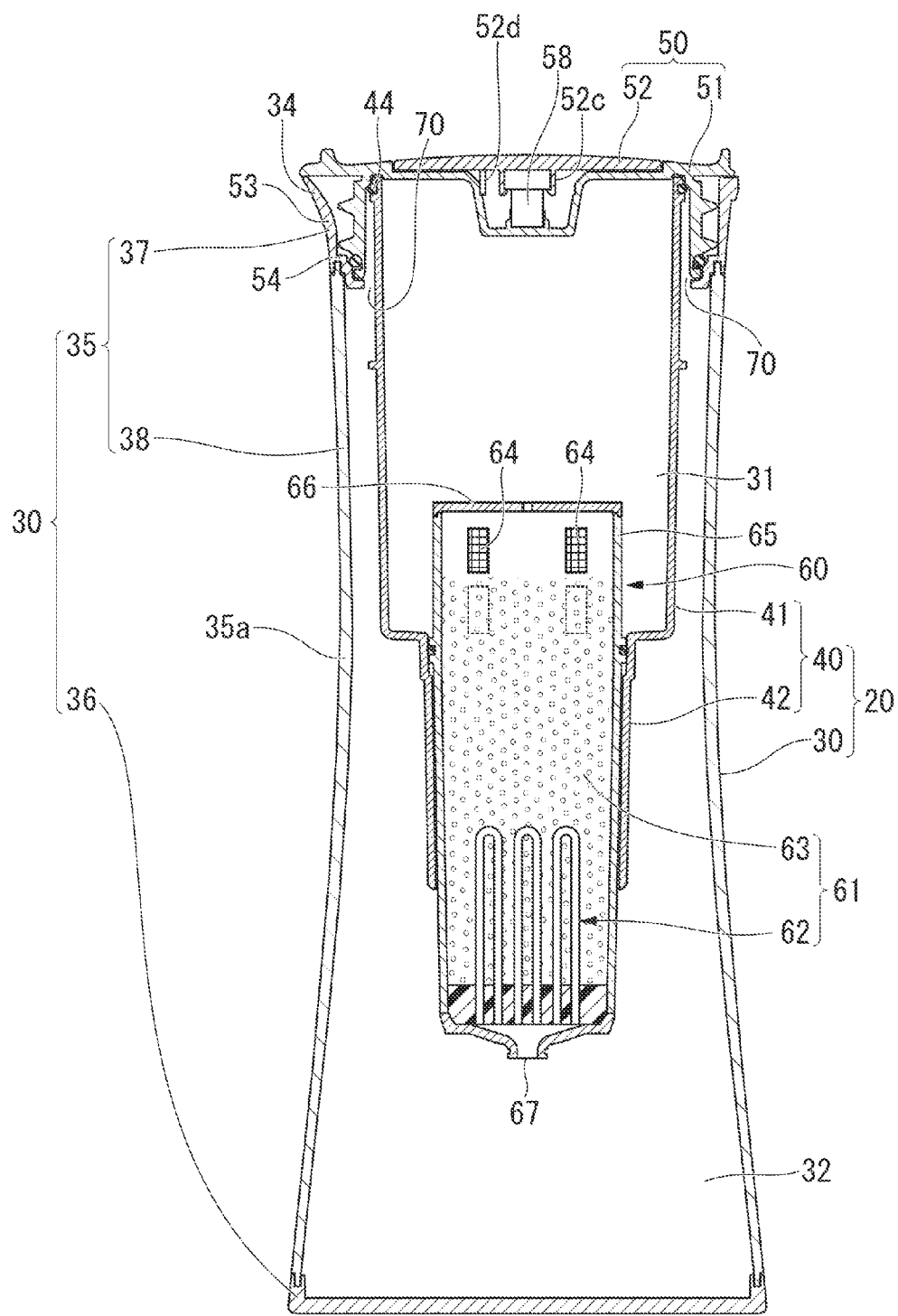
FIG. 2 is a longitudinal cross-sectional view of the pitcher-type water purifier of FIG. 1.

FIGS. 1 and 2 are diagrams illustrating one example of a pitcher-type water purifier 10 of the present invention and a perspective view and a cross-sectional view of the pitcher-type water purifier 10 which is vertically disposed.

Figure 3:
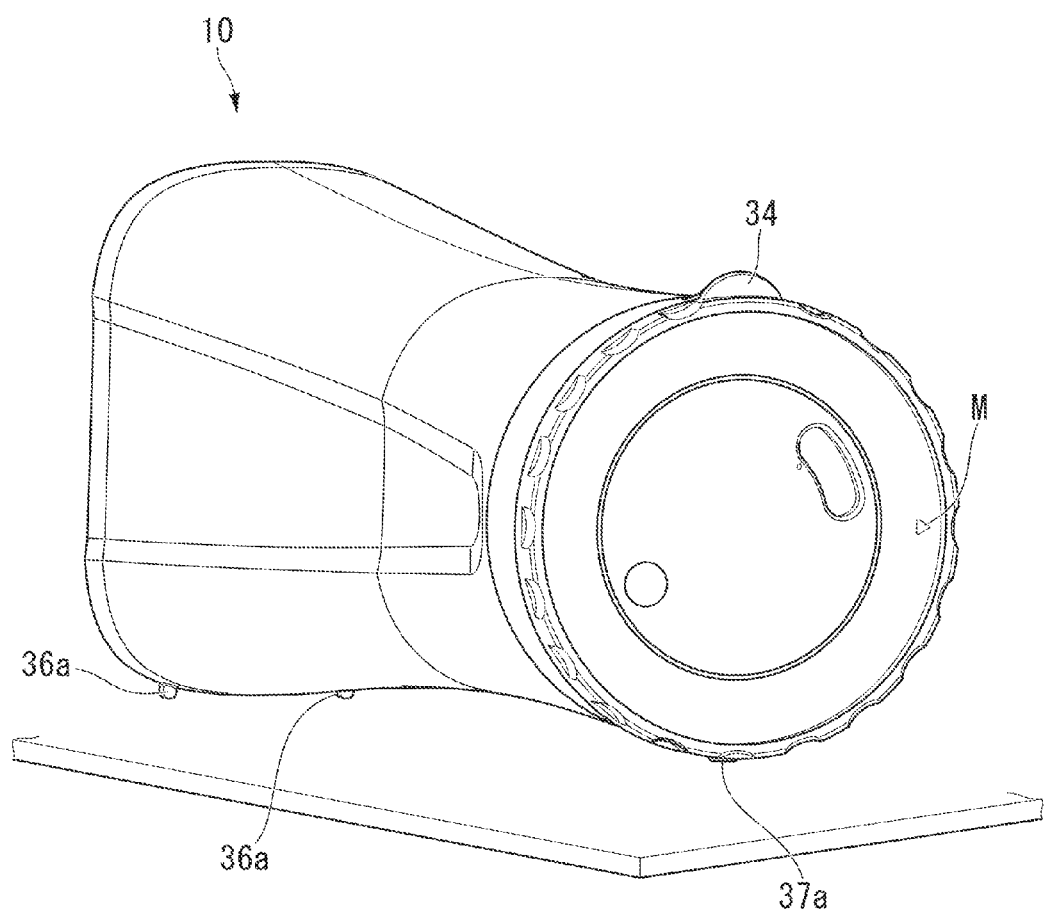
FIG. 3 is a perspective view illustrating a state in which the pitcher-type water purifier of FIG. 1 is horizontally disposed.

The pitcher-type water purifier 10 purifies water to be treated such as tap water and further, stores the obtained purified water, and includes a pitcher body 20, a pitcher lid 50 covering an opened top end 37 of the pitcher body 20, and a water purifying cartridge 60 detachably loaded into the pitcher body 20. The pitcher lid 50 of this example may liquid-tightly cover the top end 37 of the pitcher body 20. As a result, after purifying the water to be treated, the pitcher-type water purifier 10 may be horizontally disposed in a refrigerator, as illustrated in FIG. 3.

Figure 4A:
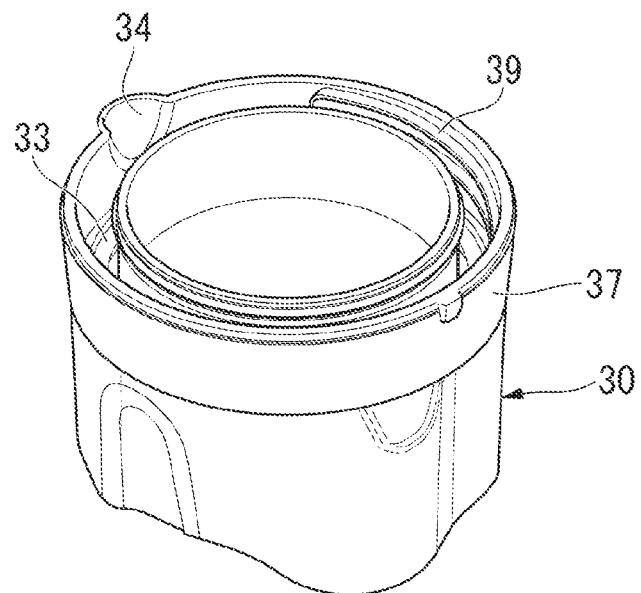
FIG. 4A is a partial perspective view illustrating an upper part of a pitcher body of the pitcher-type water purifier of FIG. 1.
Figure 4B:
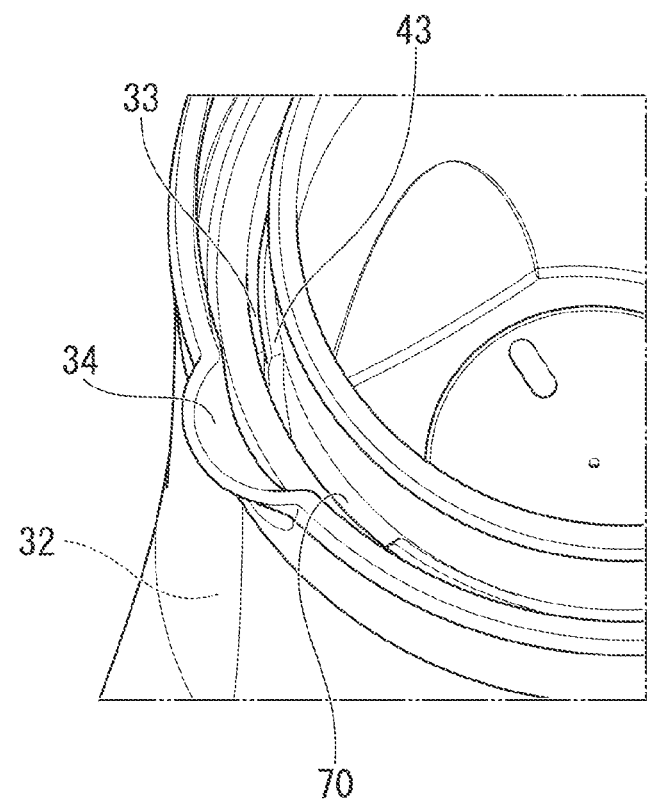
FIG. 4B is a perspective view of a principal part of an enlarged principal part of FIG. 4A.
Figure 5:
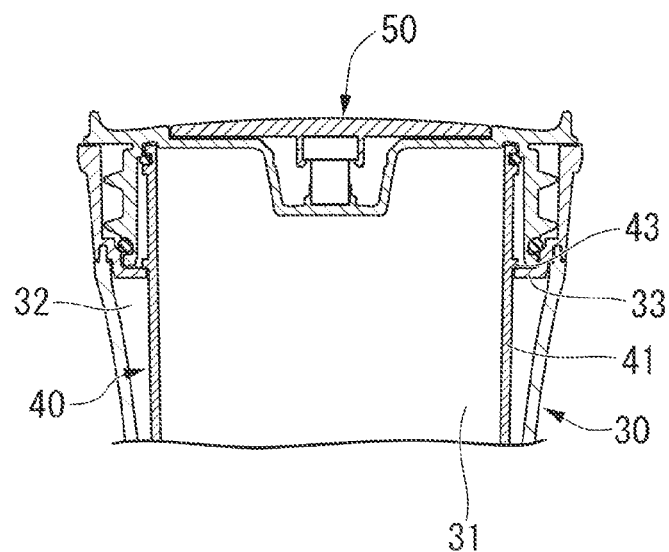
FIG. 5 is a partial longitudinal cross-sectional view illustrating the upper part of the pitcher-type water purifier of FIG. 1.

FIGS. 4A and 4B are partial perspective views illustrating an upper part of the pitcher body 20 of the pitcher-type water purifier 10 of FIG. 1 and FIG. 5 is a partial cross-sectional view illustrating an upper part of the pitcher-type water purifier 10 of FIG. 1.

Further, in the specification, "upper" and "lower" are based on a case in which the pitcher-type water purifier 10 is vertically disposed.

[Pitcher Body]

The pitcher body 20 includes a casing 30, a partition 40 for partitioning the inside of the casing 30. The inside of the casing 30 is partitioned into a raw water storage part 31 to which water to be treated is supplied and a purified water storage part 32 which stores purified water which is treated by a partition. Further, it is configured so that a cylindrical attachment part 42 is opened in the partition 40, a water purifying cartridge 60 is detachably attached into the attachment part 42, and as a result, the water to be treated supplied to the raw water storage part 31 is processed by the water purifying cartridge 60 and the acquired purified water is stored in the purified water storage part 32.

The casing 30 has a cylinder shape in which one end is opened and the other end has a closed bottom, and an end (bottom end) of the closed side becomes a bottom 36 when the pitcher-type water purifier 10 is vertically disposed.

Meanwhile, it is configured so that from an end (top end) 37 of the opened side, the water to be treated such as the tap water may be supplied to the raw water storage part 31 and further, the purified water stored in the purified water storage part 32 may be effused.

In detail, the partition 40 of this example is formed by a cylindrical body including a large-diameter part 41 and a small-diameter attachment part 42 consecutively formed therebelow, and as illustrated in FIG. 4B or 5, a locking claw part 43 formed in a circumferential direction of an upper outer periphery of the large-diameter part 41 is locked to a locking receiving part 33 formed in a circumferential direction on the inner periphery of the top end 37 of the casing 30 to be detachably attached into the casing 30. As a result, an inner side of the attached partition 40 becomes the raw water storage part 31 and an outer side becomes the purified water storage part 32.

Further, as illustrated in FIG. 4B, the locking receiving part 33 and the locking claw part 43 have notches at sites corresponding to each other, and the top end 37 of the casing 30 and the purified water storage part 32 are connected with each other by a connection hole 70 formed at the notch. In addition, at a position corresponding to the connection hole 70, the top end 37 of the casing 30 is swelled outward and becomes a purified water outlet 34 for pouring out the purified water.

Further, in the pitcher-type water purifier 10 of this example, two connection holes 70 are formed, but one site is illustrated in FIG. 4B. In addition, one purified water outlet 34 is formed at a portion corresponding to one site between two connection holes 70.

Besides, in FIGS. 1, 2, 3, and 5, a state in which the casing lid 50 is tightened to the casing 30 is illustrated. In this case, as illustrated in FIG. 2, it is configured so that the connection hole 70 and the purified water outlet 34 are sealed and the purified water may not be poured out due to a screw 53 of the casing lid 50 and a seal material formed as an O-ring 54. Meanwhile, it is configured so that the seal material formed as the O-ring 44 is attached even to the outer periphery of the top end of the partition 40, and while the pitcher lid 50 is tightened, the raw water storage part 31 and the purified water storage part 32, and the raw water storage part 31 and the outside are liquid-tightly closed.

Figure 6:
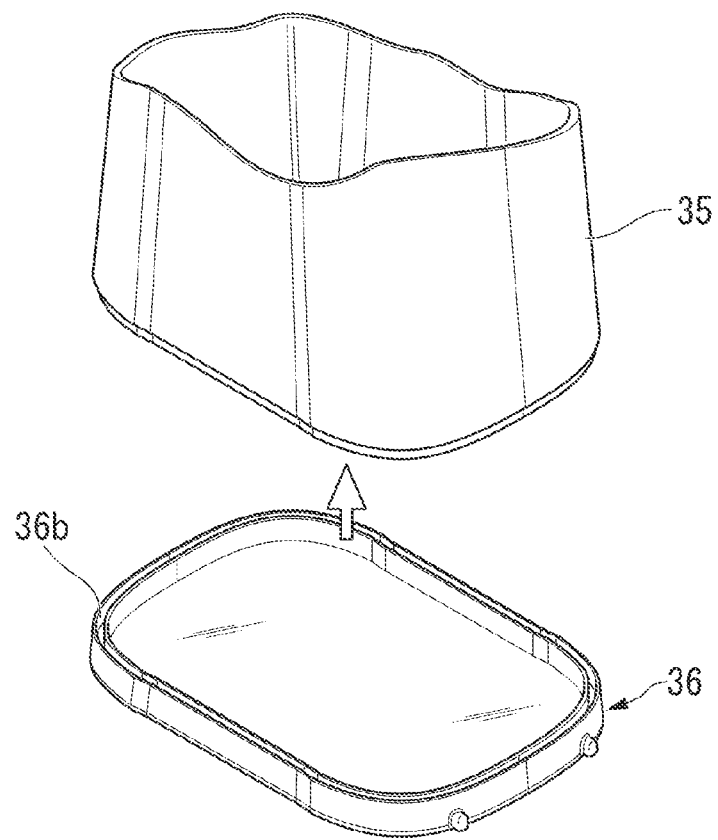
FIG. 6 is a perspective view illustrating a state before the bottom is attached to a peripheral wall of the circumference of a casing of the pitcher-type water purifier of FIG. 1.

Further, in the casing 30 of this example, a peripheral wall 35 and a bottom 36 are formed as separate bodies as illustrated in FIG. 6. A groove 36b is formed on the periphery of a top surface of the bottom 36, and while a bottom end of the peripheral wall 35 fits into the groove 36b, ultrasonic waves are radiated to the corresponding portion by an ultrasonic transmitter, and as a result, the peripheral wall 35 and the bottom 36 are integrated with each other. Further, in this example, in the peripheral wall 35, the top end 37 and a portion 38 other than the top end below the top end 37 are formed as separate bodies, and the peripheral wall 35 and the top end 37 are welded and integrated to each other by ultrasonic welding, as illustrated in FIGS. 1 and 2. In the peripheral wall 35, the portion 38 other than the top end 37 is formed by injection molding of a transparent AS resin. As the resin, although not particularly limited, an eluted resin is preferable.

Meanwhile, the top end 37 and the bottom 36 are formed by injection molding of an ABS resin which is more excellent than the AS resin in impact resistance. As the resin which is excellent in impact resistance, a resin having an Izod impact strength in the range of 50 to 1200 (J/m) is preferable and a resin having an Izod impact strength in the range 60 to 700 (J/m) is more preferable. As the resin which is excellent in impact resistance, although not particularly limited when the Izod impact strength is in the range of the value, for example, the ABS resin, a vinyl chloride resin, an acrylic resin, a polycarbonate resin, a fluorine resin, polyethylene, polypropylene, a polyurethane resin, and the like may be used and among them, the ABS resin, the vinyl chloride resin, the acrylic resin, the polycarbonate resin, the fluorine resin, polypropylene, and the polyurethane resin are preferable. As a resin used for the top end 37 and the bottom 36, the ABS resin is preferable in terms of impact resistance and further, as a resin used for the portion 38, the AS resin is preferable in that transparency and weldability to the ABS resin are excellent.

Further, in the case of the resin which is excellent in impact resistance, impact strength thereof may be generally measured by an ASTM test method D256.

Further, the top end 37 of the casing 30 has a circular transverse section, the locking receiving part 33 is formed on the inner periphery of the top end 37, and the screw 39 screwed with the casing lid 50 is formed above the locking receiving part 33. Meanwhile, the bottom 36 of the casing 30 is formed in a quadrangle shape. As a result, the transverse section of the casing 30 is formed in a shape in which a circle is consecutively transformed to the quadrangle shape from the top to the bottom. Further, it is configured so that a neck 35a which is diameter-reduced is formed a lightly above the center of in the height direction of the peripheral wall 35, and a design of the casing 30 is excellent and further, it is easy for a user to tilt the pitcher-type water purifier 10 in order to transport the pitcher-type water purifier 10 or pour out the purified water by gripping the vicinity of the neck 35a.

Further, two feet 36a and 36a that are projected laterally are formed on a single side of four sides of the bottom 36 of the casing 30 and further, one foot 37a that is projected laterally is formed even on the top end 37. By turning the feet 36a and 37a downward, the pitcher-type water purifier 10 may be stably horizontally disposed in the refrigerator, and the like, as illustrated in FIG. 3.

[Pitcher Lid]

Figure 7:
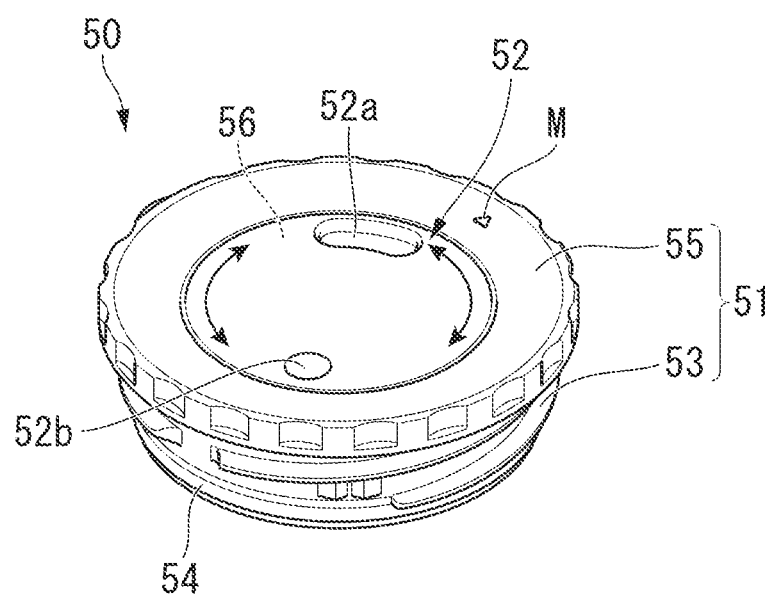
FIG. 7 is a perspective view illustrating a pitcher lid of the pitcher-type water purifier of FIG. 1.

FIG. 7 is a perspective view of the pitcher lid 50.

The pitcher lid 50 of this example includes a disk-shaped lid part 55 and a lid body 51 including a screw 53 screw to the screw 39 of the pitcher body 20, and the lid body 51 serves to liquid-tightly close the opened top end 37 of the pitcher body 20. In detail, by tightening the lid body 51, the top end 37 is liquid-tightly closed through the action of the seal material formed as the O-ring 54 attached to the outer periphery of the bottom end of the screw 53 and a seal material formed as an O-ring 44 attached to the outer periphery of the top end of the partition 40.

Figure 8:
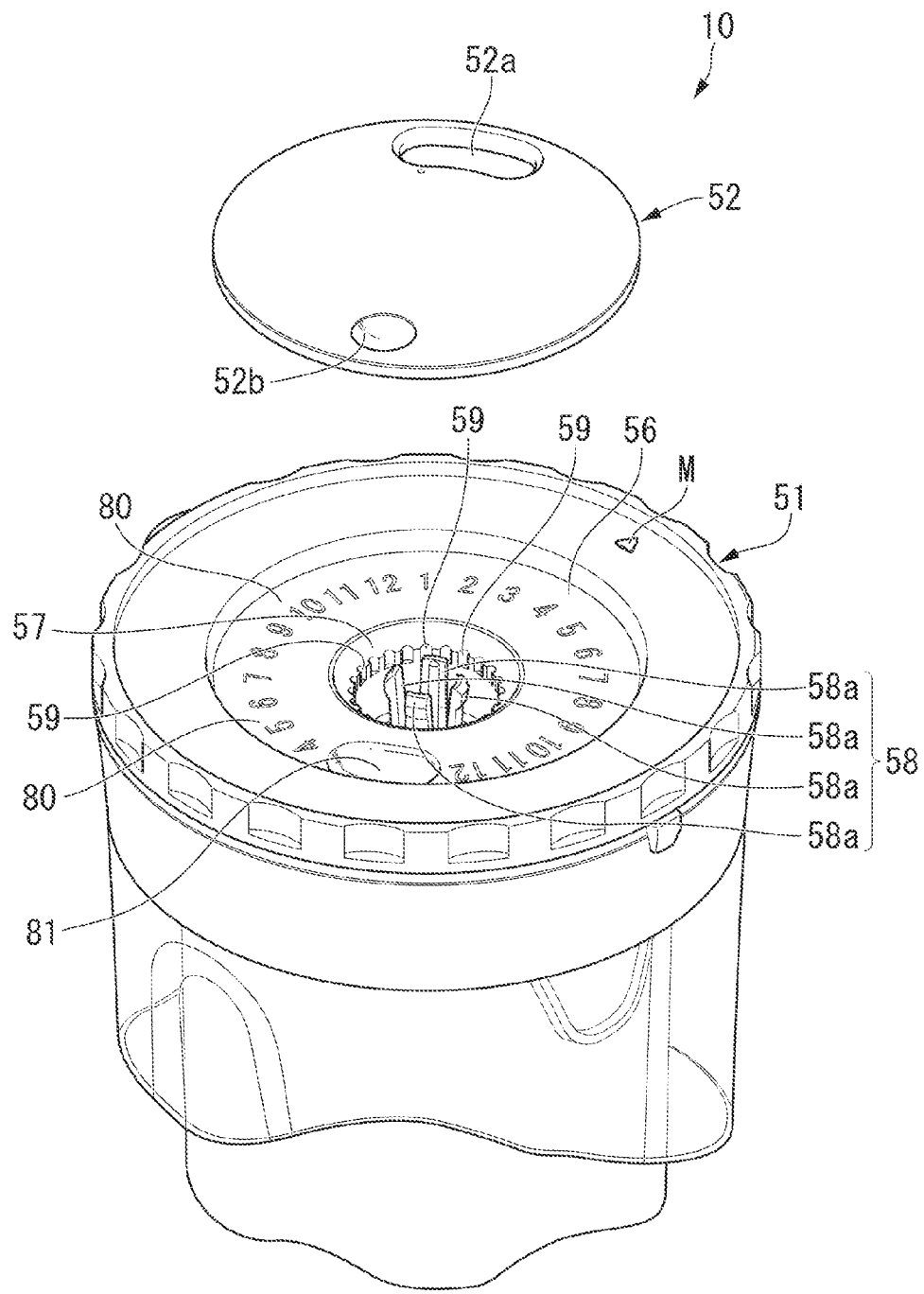
FIG. 8 is a partially enlarged perspective view illustrating a state in which a dial board is separated from the pitcher lid of FIG. 7.

Further, the pitcher lid 50 is detachably attached on to the top surface of the lid body 51 and has a disk-shaped dial board 52 which is pivotable in an arrow direction in FIG. 7. FIG. 8 is a partially enlarged perspective view illustrating a state in which the dial board 52 is separated from the pitcher lid 50.

In detail, a first concave 56 and a second concave 57 of which transverse sections have a concentric circular shape as the lid body 51 are formed on the top surface of the lid body 51.

It is configured so that the transverse section of the first concave 56 is formed in a circle shape having the same diameter as the dial board 52 and the dial board 52 fits into the first concave 56.

Figure 9:
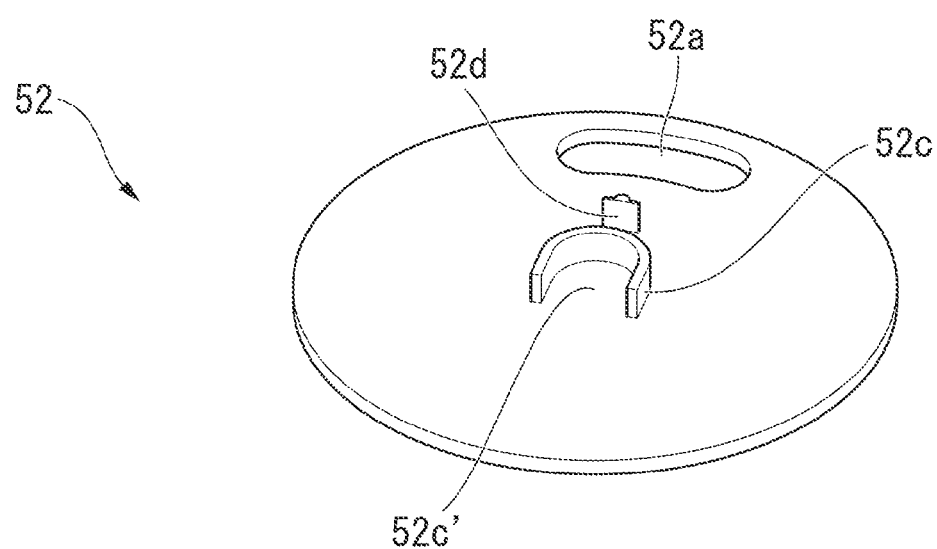
FIG. 9 is a perspective view of the dial board of the pitcher lid of FIG. 7 as viewed from a rear surface.

The second concave 57 is formed in the first concave 56 and a claw 58 constituted by four engagement claws 58a which stand in a circular shape is formed at the center of the bottom thereof. Further, a cylindrical projection 52c is projected at the center of a rear surface of the dial board 52 as illustrated in FIG. 9. The projection 52c of this example has a U-shaped transverse section and has a cylindrical shape in which a peripheral wall surface is partially opened. Therefore, when the dial board 52 fits into the first concave 56 as illustrated in FIG. 7, the claw 58 fits into the projection 52c and the dial board 52 is pivotally attached and mounted onto the lid body 51.

Further, the user places his/her finger at the concave 52b which is formed on the surface thereof the dial board 52 pivots by turning the dial board and turns the dial board 52, and as a result, the dial board 52 pivots.

In addition, a plurality of marks 80 constituted by numerical values of 1 to 12 representing respective months of January to December is disposed in an annular shape around the claw 58 on the top surface of the first concave 56 of the lid body 51 of this example as illustrated in FIG. 8. Meanwhile, a window 52a that penetrates the rear surface from the surface of the dial board 52 is opened on the dial board 52. Therefore, it is configured so that the user appropriately pivots the dial board 52 to selectively display some of the plurality of marks 80 from the window 52a.

Figure 10A:
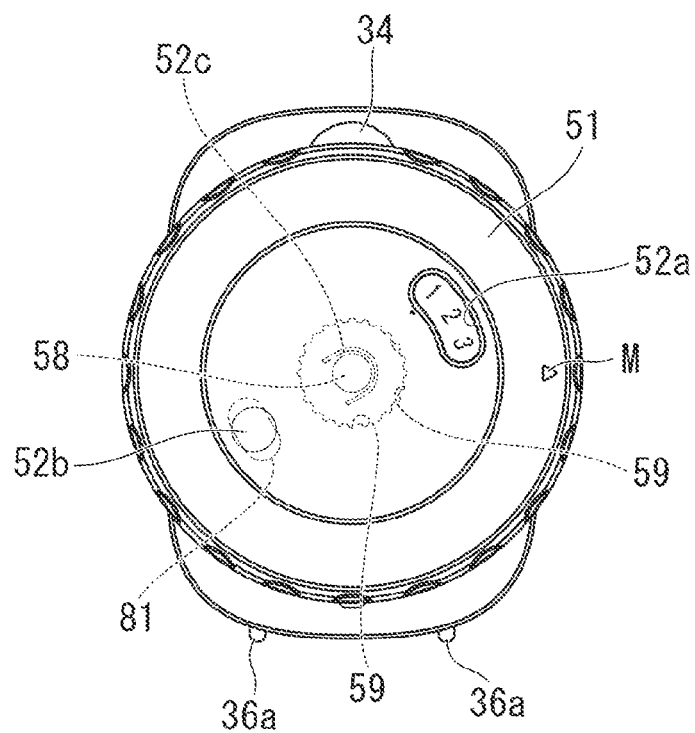
FIG. 10A is a plan view illustrating a state in which numerical values referring to "January, February, and March" is displayed from a window by pivoting the dial board of the pitcher lid of FIG. 7.

In this example, it is configured so that three numerical values may be selectively displayed from the window 52a and in the illustrated example, "1, 2, and 3" are displayed, as illustrated in FIG. 10A. The three numerical values, "1, 2, and 3" refer to three months of "January, February, and March" and are usable months of the water purifying cartridge 60 mounted on the pitcher-type water purifier 10 of this example. In generally using the water purifying cartridge 60, approximately three months are displayed from a next month in which using the water purifying cartridge 60 starts. That is, in this example, the water purifying cartridge 60 is attached on December, and it is displayed that exchanging the water purifying cartridge 60 on March is appropriate in terms of a life-span.

As such, in the pitcher-type water purifier 10, a subsequent month of a time (mounting time) in which the water purifying cartridge and a time (exchange time) when exchanging the water purifying cartridge is preferable are displayable from the window 52a of the dial board 52.

Figure 10B:
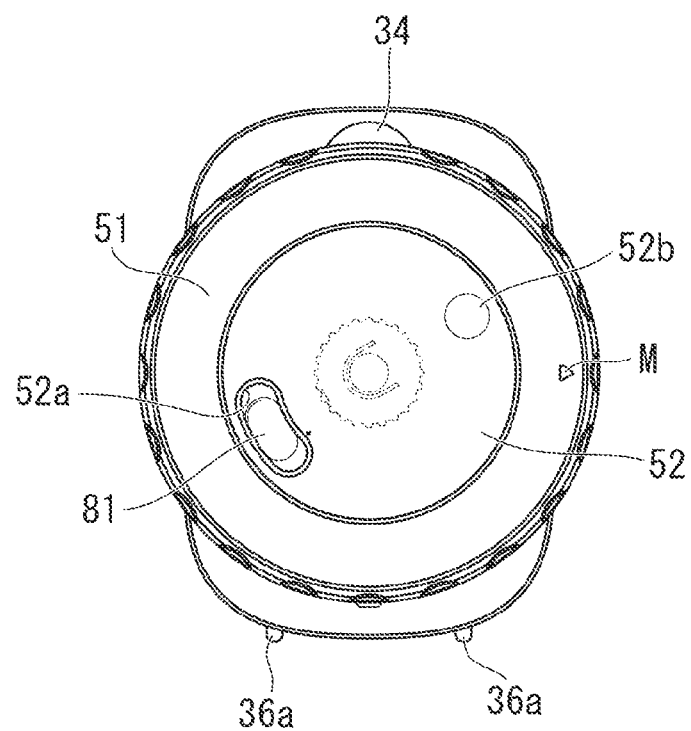
FIG. 10B is a plan view illustrating a state in which the window and a concave match each other by pivoting the dial board of the pitcher lid of FIG. 7.

Further, on the top surface of the first concave 56 of the lid body 51, one concave 81 is formed on the same circle as the plurality of marks 80 which is disposed in an annular shape. Therefore, it is configured so that the user appropriately pivots the dial board 52 to make the window 52a and the concave 81 match each other as illustrated in FIG. 10B.

When the window 52a and the concave 81 match each other, the end of the user's finger easily enters the window 52a as compared with a case in which the window 52a and the concave 81 do not match each other. As a result, by making the window 52a and the concave 81 match each other, the user inserts the end of a user's forefinger into the window 52a, hooks the forefinger to the periphery of the window 52a, and easily draws the dial board 52 upward by using the window 52a as a starting point.

Meanwhile, the projection 52c which is provided on the rear surface of the dial board 52 has the aforementioned U-shaped transverse section and has a shape in which a part of a peripheral wall of a cylinder is partially opened. In addition, an opened opening 52c' is provided in a direction to be opened in an opposite side to a side in which the window 52a is formed on the dial board 52.

Figure 11:
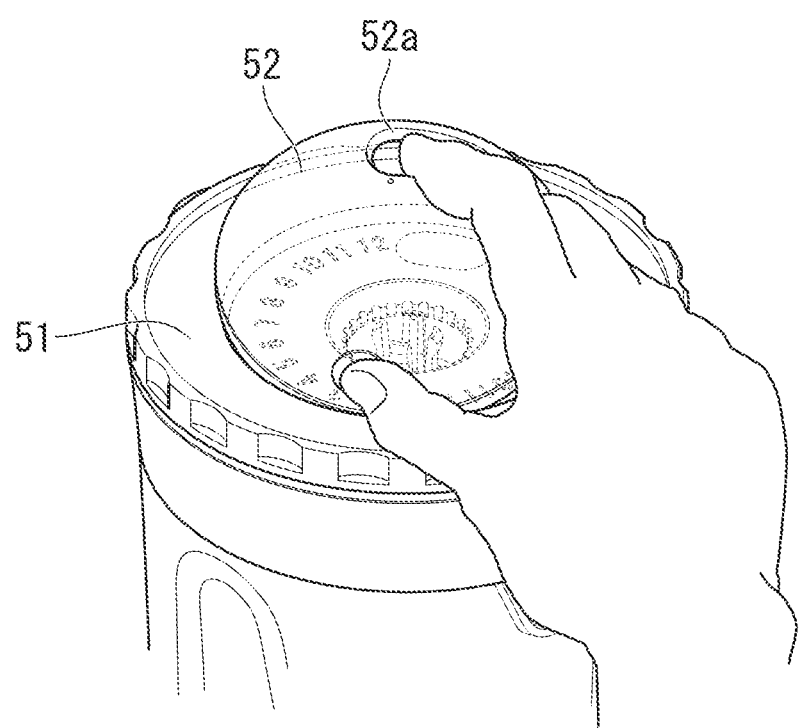
FIG. 11 is a perspective view illustrating a state in which the dial board of the pitcher lid of FIG. 7 is removed from a lid body.

Therefore, as illustrated in FIG. 11, when the user inserts the forefinger from the window 52a and draws the dial board 52 upward, fitting of the projection 52c of the rear surface of the dial board 52 and the claw 58 of the lid body 51 are unfitted by the existence of the opening 52c' and the dial board 52 may be easily removed from the lid body 51.

The window 52a and the concave 81 match each other, and as a result the user may easily separate the dial board 52 from the lid body 51 and when the dial board 52 becomes dirty, the user may remove and wash the dial board 52.

Further, in the pitcher lid 50 of this example, the projection 52c of the dial board 52 fits into the claw 58 that stands in the lid body 51 that liquid-tightly closes the top end 37 of the pitcher body 20 to attach/detach the dial board 52 to/from the lid body 51. As a result, even though the dial board 52 is separated from the lid body 51, liquid tightness of the pitcher lid 50 is not influenced.

Further, a plurality of vertical grooves 59 is formed on the inner peripheral surface of the second concave 57 throughout a whole circumference of the inner peripheral surface and a projection 52d which is engageable to one groove 59 is projected on the rear surface of the dial board 52. In addition, each groove 59 is provided to corresponding to each mark 80. As a result, it is configured so that whenever the user pivots the dial board 52 and shifts the numerical value displayed from the window 52a by each month, the projection 52d passes over convexes among the respective grooves 59 to have a click feeling.

[Water Purifying Cartridge]

As illustrated in FIG. 2, the water purifying cartridge 60 of the pitcher-type water purifier 10 of this example includes a water purification material 61 for processing the water to be treated, a cylindrical housing body 65 having a bottom received with the water purification material 61, and a plate-shaped housing lid 66 covered and integrated to the housing body 65.

The water purification material 61 of this example is configured so that it has a film filtration water purification unit 62 having a hollow fiber film module and an adsorption water purification unit 63 formed by an activated carbon, which is disposed at an upstream side of the film filtration water purification unit 62.

Further, upper and lower two-line intake holes 64 for taking the water to be treated of the raw water storage part 31 into the water purifying cartridge 60 are formed in an upper portion of a peripheral wall of the housing body 65.

A discharge hole 67 is formed at the center of the bottom of the housing body 65 and purified water that is taken in from the intake hole 64 and treated by the water purification material 61 is discharged therefrom. The discharged purified water is stored in the purified water storage part 32.

[Pitcher-Type Water Purifier]

When the water to be treated is purified by the pitcher-type water purifier 10 of this example and the acquired purified water is stored, first, the pitcher lid 50 is released and separated from the pitcher body 20, and the water to be treated such as the tap water is supplied to the raw water storage part 31 from the opened top end 37 of the pitcher body 20. The water to be treated in the raw water storage part 31 is taken in from each intake hole 64 of the water purifying cartridge 60 and treated by the water purification material 61. In addition, the purified water is discharged from the discharge hole 67 and stored in the purified water storage part 32.

When the pitcher lid 50 is tightened and the top end 37 of the pitcher body 20 is closed while the water to be treated is processed as above, air is not taken into the raw water storage part 31 and the water to be treated is not treated by the water purification material 61. Therefore, while the water to be treated is treated, the pitcher lid 50 is released to allow air to be taken in.

The water to be treated in the raw water storage part 31 is treated in all of the water purifying cartridges 60 and stored in the purified water storage part 32 and then, the pitcher lid 50 may be tightened to liquid-tightly close the top end 37 of the pitcher body 20 as well as the action of the O-ring 44 mounted on the top of the partition 40 and the O-ring 54 mounted on the pitcher lid 50.

In the pitcher-type water purifier 10, since the top end 37 may be liquid-tightly closed as above, as illustrated in FIG. 3, the pitcher-type water purifier 10 may be horizontally disposed in the refrigerator, or the like. When the feet 36a and 37a are horizontally disposed in the lower part, a purified water outlet 34 is positioned in the upper part.

When the purified water is poured out in a cup, or the like from the pitcher-type water purifier 10, the pitcher lid 50 is released to make a triangular mark M match the purified water outlet 34 and thereafter, the pitcher-type water purifier 10 is inclined by gripping the neck 35a of the pitcher-type water purifier 10 and the purified water is poured out from the purified water outlet 34. A screw thread is not provided at the screw 53 of a portion corresponding to the mark M and the mark M matches the purified water outlet 34 to smoothly pour out the purified water.

Further, for example, when the water purifying cartridge 60 is replaced with a new water purifying cartridge, the user turns the dial board 52 of the pitcher lid 50 and allows "a subsequent month, a subsequent month thereto, and a subsequent month thereto of the replacement time (mounting time)" to be displayed from the window 52a to recognize a mounting time of the water purifying cartridge 60 and a subsequent replacement time of the water purifying cartridge 60. As a result, the water purifying cartridge 60 may be replaced at an appropriate time. Further, when the vicinity of the dial board 52 becomes dirty with the use of the pitcher-type water purifier 10, the dial board 52 is separated and washed as illustrated in FIG. 11.

In the pitcher-type water purifier 10, since the bottom 36 and the peripheral wall 35 of the casing 30 are formed as separate bodies, the bottom 36 may be made of a different material from the peripheral wall 35. In particular, like this example, the AS resin is used for the peripheral wall 35 by seriously regarding transparency and further, the ABS resin is used for the bottom 36 in terms of impact resistance to improve durability of the bottom 36 which is easy to bump into a door pocket, or the like with carry-in and carry-out with respect to the refrigerator, or the like.

Further, the bottom 36 and the peripheral wall 35 of the casing 30 are formed as the separate bodies, and as a result, the degree of freedom of the shape of the casing may be increased.

For example, if the casing in which the bottom and the peripheral wall are integrated molded intends to be molded through the injection molding, a mold is de-molded from the opened top end, and as a result, it is difficult to mold a casing having a shape in which the top end is narrower than the bottom or the casing 30 having the neck 35a like the example of FIG. 1.

In this regard, when the bottom 36 of the casing 30 is the separate body, a peripheral wall having a shape in which both top and bottom ends are opened is formed, and as a result, two molds are used, and one mold may be de-molded from the top end and the other mold may be molded from the bottom end. Therefore, although it is difficult to mold the casing having the shape in which the bottom and the peripheral wall are integrally molded, it is easy to mold the casing having the shape in which the top end is narrower than the bottom or the casing 30 having the neck 35a like the example of FIG. 1, and the degree of freedom of the casing is improved.

Further, like this example, when the top end 37 is formed as the separate body from the portion 38 other than the top end, the top end 37 may be made of a material seriously regarding impact resistance in order to increase durability while handling or prevent the screw 39 from being damaged even with respect to the top end 37. Further, in this example, the ABS resin is exemplified as a material having impact resistance suitable for forming the bottom 36 or the top end 37, but the material having impact resistance is not limited to the ABS resin. Further, as the material suitable for forming the peripheral wall 35, the AS resin is exemplified, but the material having transparency is not limited to the AS resin.

Further, in the casing 30 of the pitcher-type water purifier 10, the top end 37 has the circular transverse section and the bottom 36 is formed in the quadrangle shape (rectangle shape). As a result, it is impossible to increase the capacity of the casing 30 or receive the casing 30 in the door pocket of the refrigerator while keeping operability of the pitcher lid 50.

That is, in the pitcher-type water purifier 10 of this example, since the pitcher lid 50 is a screw type, the pitcher lid 50 and the transverse section of the top end 37 of the casing 30 need to have the circular shape. Further, the pitcher lid 50 and the top end 37 of the casing 30 need to have sizes for the user to easily tighten or release by gripping the pitcher lid 50. In addition, the pitcher-type water purifier 10 is required to have a size to be compactly inserted into the door pocket of the refrigerator, while improvement of the capacity of the pitcher-type water purifier 10 is also required.

In this case, receptability in the door pocket of the refrigerator or the capacity may be improved without influencing the operability of the pitcher lid 50 by enlarging the bottom 36 within a range to receive the casing 30 in the door pocket by forming the bottom 36 of the casing 30 in the quadrangle shape.

Further, herein, the quadrangle shape includes even a rectangle shape having a curvature R, in which at least one of four edges is rounded.

Further, in the pitcher-type water purifier 10, the plurality of marks 80 is formed in an annular shape on the top surface of the lid body 51 of the pitcher lid 50 and further, the pitcher-type water purifier 10 includes the pivotable dial board 52 that selectively displays some of the plurality of marks 80 from the window 52*a* on the plurality of marks 80. In addition, in this example, it is configured so that the subsequent month of the mounting of the water purifying cartridge 60 and the replacement time of the water purifying cartridge 60 are displayed from the window 52*a*. As a result, the user may replace the water purifying cartridge 60 at the appropriate time by recognizing the mounting time and the replacement time of the water purifying cartridge 60.

Further, in this example, according to the life-span of the water purifying cartridge 60 which is mounted, a pattern representing three months of "the subsequent month of the replacement time (mounting time), the subsequent month thereto, and the subsequent month thereto (replacement time)" is exemplified. However, the number of months displayed from the window 52*a* may be appropriately changed according to the life-span of the water purifying cartridge.

Further, in this example, the subsequent month of the mounting and the replacement time are displayed, but only any one time may be displayed from the window.

In addition, a time other than the subsequent month of the mounting of the water purifying cartridge or the replacement time may be displayed and a type of the display is not limited.

Further, the dial board 52 of this example may be detachably fit and easily removed. Therefore, when the vicinity of the dial board 52 becomes dirty with the use of the pitcher-type water purifier 10, the dial board 52 may be simply separated and washed.

Further, the projection of the dial board is not fitted into an opened attachment hole of the lid body, but the projection 52*c* of the dial board 52 is fitted into the claw 58 that stands in the lid body 51 to attach/detach the dial board 52 to/from the lid body 51. As a result, even though the dial board 52 is separated from the lid body 51, the liquid tightness of the pitcher lid 50 is not influenced and for example, when the pitcher-type water purifier 10 is horizontally disposed, the dial board 52 may be separated and washing.

Further, in this example, a sealing type as the pitcher lid 50 is the screw type, but the sealing type may be a bayonet type.

In addition, the water purifying cartridge of the present invention will be described in more detail.

Figure 12A:
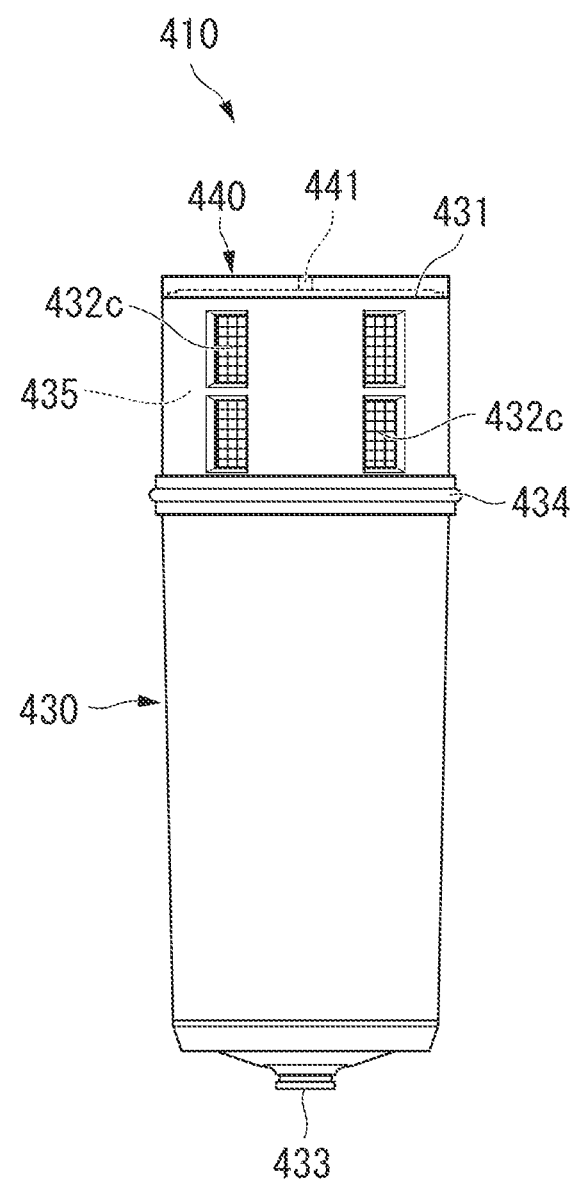
FIG. 12A is a front view illustrating one example of a water purifying cartridge of the present invention.
Figure 12B:
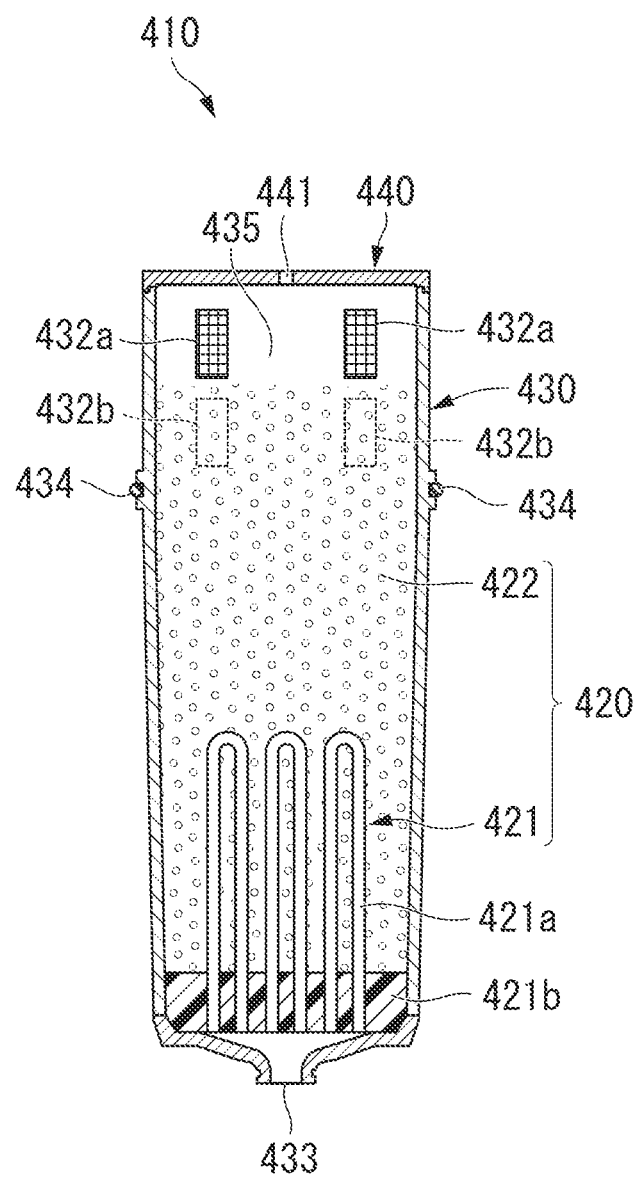
FIG. 12B is a longitudinal cross-sectional view illustrating one example of the water purifying cartridge of the present invention.
Figure 13:
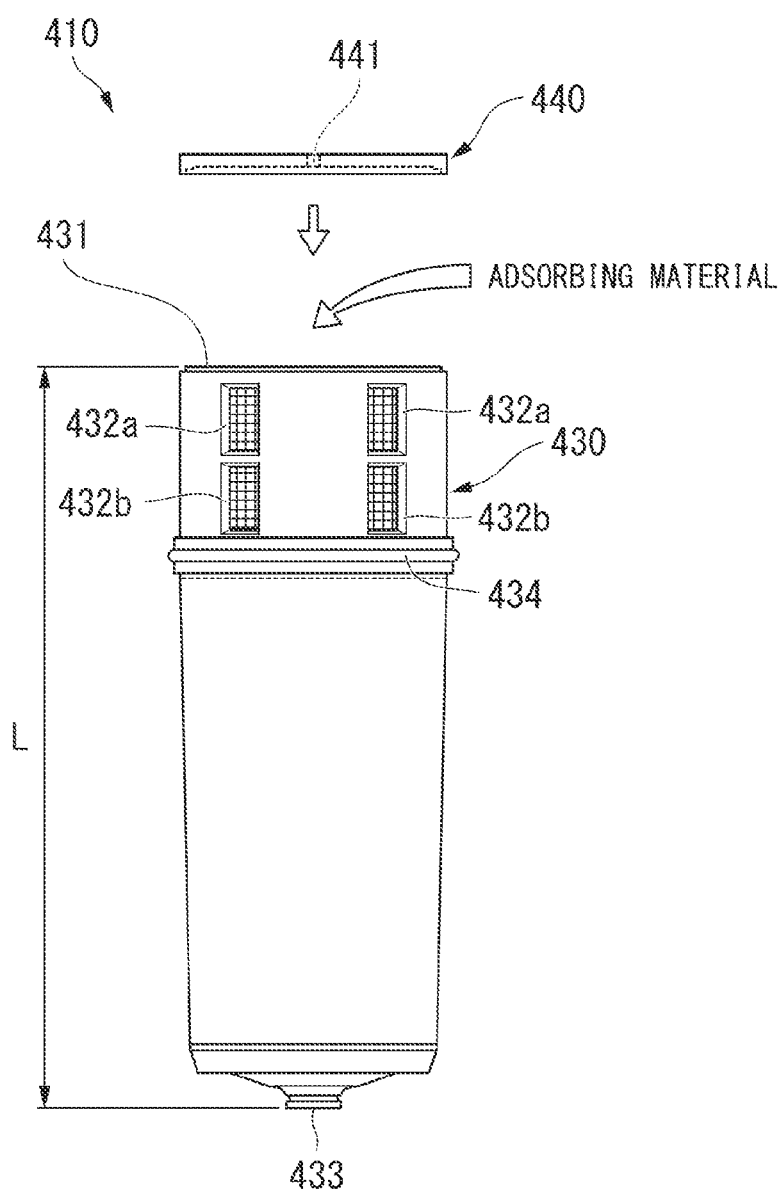
FIG. 13 is a front view illustrating a state before the housing lid and the housing body are welded to the water purifying cartridge of FIGS. 12A and 12B.

FIG. 12A is a front view illustrating one example of a water purifying cartridge 410 of the present invention and FIG. 12B is a cross-sectional view illustrating one example of the water purifying cartridge 410 of the present invention. The water purifying cartridge 410 includes a water purification material 420 for treating the water to be treated such as the tap water, a cylindrical housing body 430 received with the water purification material 420, and a plate-shaped housing lid 440 covered in the housing body 430, and the housing body 430 and the housing lid 440 are configured as separate bodies, as illustrated in FIG. 13.

Figure 14:
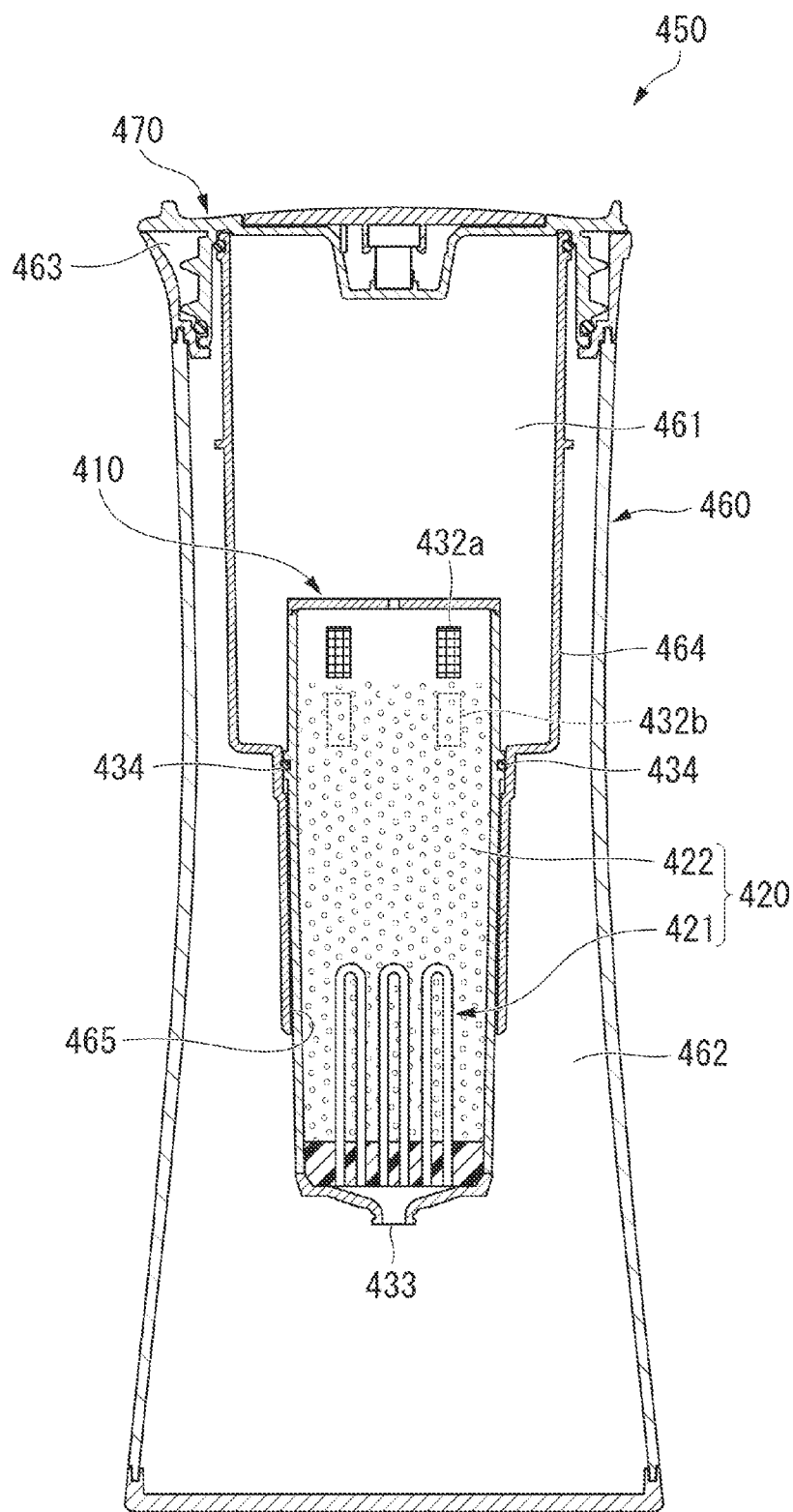
FIG. 14 is a longitudinal cross-sectional view illustrating one example of the pitcher-type water purifier of the present invention.

FIG. 14 illustrates a pitcher-type water purifier 450 including a water purifying cartridge 410 of FIGS. 12A and 12B. The pitcher-type water purifier 450 includes a pitcher body 460, a pitcher lid 470 liquid-tightly closing an opening of the top end of the pitcher body 460, and a water purifying cartridge 410 of FIGS. 12A and 12B detachably loaded into the pitcher body 460. In the pitcher body 460, a raw water storage part 461 to which the water to be treated is supplied and a purified water storage part 462 storing purified water are partitioned by a partition 464. An attachment part 465 is opened in the partition 464 and the water purifying cartridge 410 of FIGS. 12A and 12B is mounted on the attachment part 465. Further, a purified water outlet 463 for pouring out the purified water is formed in the purified water storage part 462.

A water purification material 420 of the water purifying cartridge 410 of FIGS. 12A and 12B includes a film filtration water purification unit 421 and an adsorption water purification unit 422 disposed at an upstream side of the film filtration water purification unit 421.

In the film filtration water purification unit 421, a plurality of hollow fiber films 421*a* which is curved in a U shape is integrated by a potting portion 421*b* filled between ends while maintaining an opening of the end thereof and further, the film filtration water purification unit 421 includes, for example, a hollow fiber film module fixed to the lower portion of the housing body 430. The adsorption water purification unit 422 is configured by an adsorbing material filled in an upstream side of the film filtration water purification unit 421.

Materials of the hollow fiber film 421*a* may include, for example, polyethylene, polypropylene, poly (4-methylpentene-1), polytetrafluoroethylene, polyvinylidine fluoride, polystyrene, polysulfone, polyether ketone, polyetheretherketone, and the like.

The potting portion 421*b* is formed by, for example, curing a thermoset resin and the thermoset resin may include, for example, an epoxy resin, a urethane resin, a silicone resin, an unsaturated polyester resin, and the like.

As the adsorbing material, in this example, adsorbing materials such as a powdery or granular activated carbon, zeolite, and molecular sieve are used. Other adsorbing materials may include a fibrous adsorbing material such as a fibrous activated carbon.

The housing body 430 has a cylindrical shape in which the top end 431 is opened, the hollow fiber film module constituting the film filtration water purification unit 421 is received and fixed to the housing body 430 from the opening of the top end 431 and then, the adsorbing material constituting the adsorption water purification unit 422 is filled.

In addition, in the water purifying cartridge 410, upper and lower two-line intake holes 432a and 432b for taking the water to be treated into the water purifying cartridge 410 are formed in the upper part of a peripheral wall of the housing body 430. In this example, when the total length of the housing body 430 is set as L, the intake holes 432a and 432b are formed on the peripheral wall within the range up to approximately ⅓ L downward from the top end 431 of the housing body 430.

Further, in this example, a plurality of upper intake holes 432a and a plurality of lower intake holes 432b are formed in a circumferential direction. Further, it is configured so that a mesh sheet 432c is disposed at each intake hole 432a or 432b, and the water to be treated may be taken into the water purifying cartridge 410 while suppressing the adsorbing material from being discharged from the intake holes 432a and 432b to the outside.

The discharge hole 433 is formed at the center of the bottom of the housing body 430 and purified water that is taken in from the intake holes 432a and 432b and treated by the water purification material 420 is discharged. Further, the bottom of the housing body 430 is included downward toward the discharge hole 433.

A seal material 434 formed as the O-ring is mounted on the outer periphery of the upper part of the housing body 430. As illustrated in FIG. 14, when the water purifying cartridge 410 is mounted on the attachment part 465 of the pitcher-type water purifier 450, it is configured so that a space between the raw water storage part 461 and the purified water storage part 462 is liquid-tightly sealed by the seal material 434. Further, the seal material 434 in the housing body 430 is positioned to be a little lower than the intake holes 432a and 432b (lower than the lower end of the lower intake hole 432b by 1 to 2 mm). As a result, when the water purifying cartridge 410 is mounted on the pitcher-type water purifier 450, the intake holes 432a and 432b are positioned at appropriate heights in the raw water storage part 461, and the water to be treated may be taken in from the intake holes 432a and 432b without leaving the water to be treated in the raw water storage part 461.

The plate-shaped (disk-shaped) housing lid 440 is covered on the opening of the top end 431 of the housing body 430 and closes the opening. The housing lid 440 is welded and fixed by ultrasonic welding, in this example. Further, an air discharge hole 441 which allows the inside and the outside of the water purifying cartridge 410 to communicate with each other is formed at the center of the housing lid 440.

Materials of the housing body 430 and the housing lid 440 may include resins (the ABS resin, polycarbonate, an acrylic resin, polypropylene, polystyrene, and the like), a metal, (stainless steel), and the like.

In the water purifying cartridge 410, the adsorbing material constituting the adsorption water purification unit 422 is filled up to a height of the vicinity between the upper intake hole 432a and the lower intake hole 432b and an air storage unit 35 is formed above the filled adsorbing material. It is configured so that the water to be treated is more smoothly taken into the water purifying cartridge 410 from the intake holes 432a and 432b by the action between the air storage unit 35 and the air discharge hole 441 formed at the center of the housing lid 440.

The water purifying cartridge 410 is assembled and manufactured as described below, for example. The housing body 430 in which the intake holes 432a and 432b are formed and the seal material (O-ring) 434 is attached is prepared. In addition, the hollow fiber film module constituting the film filtration water purification unit 421 is received into the housing body 430 and fixed to the bottom of the housing body 430, from the opening of the top end 431. Subsequently, the adsorbing material is filled from the opening of the top end 431 of the housing body 430 and the adsorption water purification unit 422 is formed at an upstream side of the film filtration water purification unit 421.

Herein, the amount of the filled absorbing material is adjusted to an amount as if the top end (the top end of the adsorption water purification unit 422) of the filled adsorbing material is positioned in the vicinity between the upper-line intake hole 432a and the lower-line intake hole 432b, in this example, in that the effective air storage unit 435 having a sufficient volume is formed and further, an unnecessary dead space in which the adsorbing material is not filled is reduced as possible. However, the amount of the filled adsorbing material is not limited thereto and may be appropriately adjusted while considering the volume of the air storage unit 435 or the dead space.

The water purifying cartridge 410 manufactured as above is mounted on the attachment part 465 formed in the partition 464 of the pitcher-type water purifier 450 as illustrated in FIG. 14. When water is purified by the pitcher-type water purifier 450, the pitcher lid 470 is separated and the water purifying cartridge 410 is mounted on the attachment part 465 and then, the water to be treated such as the tap water is supplied to the raw water storage part 461 from the top opening. The water to be treated in the raw water storage part 461 is taken in from each intake hole 432a or 432b of the water purifying cartridge 410 and treated by the water purification material 420. In addition, the purified water is discharged from the discharge hole 433 and stored in the purified water storage part 462.

Further, the pitcher-type water purifier 450 of this example may include the pitcher lid 470 that liquid-tightly closes the top opening of the pitcher body 460. As a result, after the water to be treated is treated and stored in the purified water storage part 462, the top opening of the pitcher body 460 is liquid-tightly closed by tightening the pitcher lid 470 and the pitcher-type water purifier 450 may be horizontally disposed in the refrigerator, and the like.

Figure 15A:
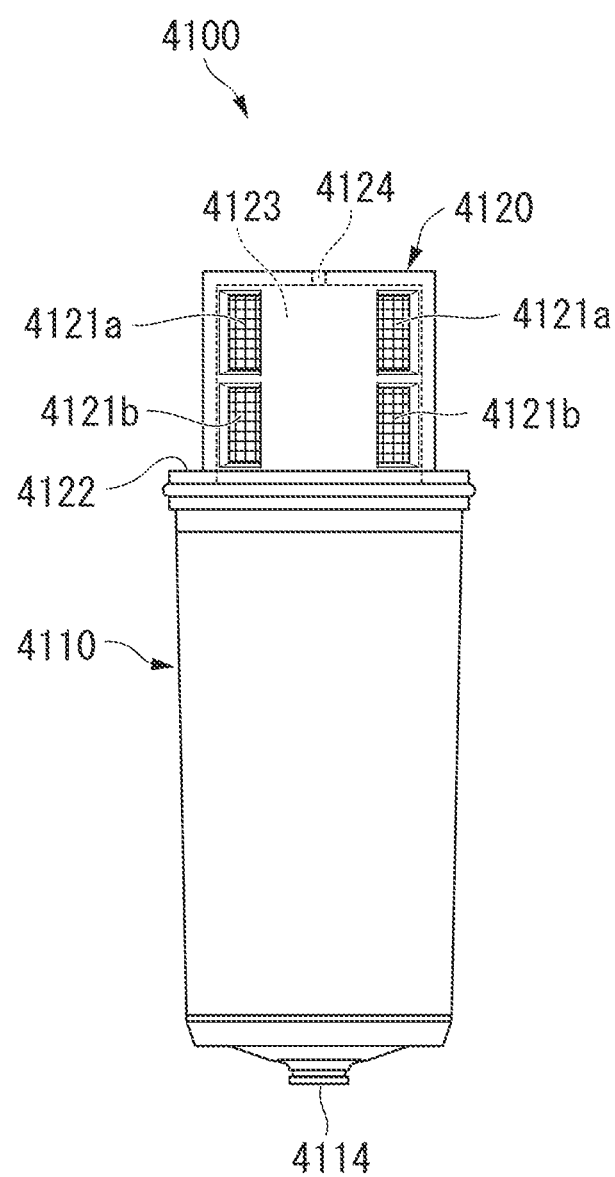
FIG. 15A is a front view illustrating one example of a water purifying cartridge in the related art.
Figure 15B:
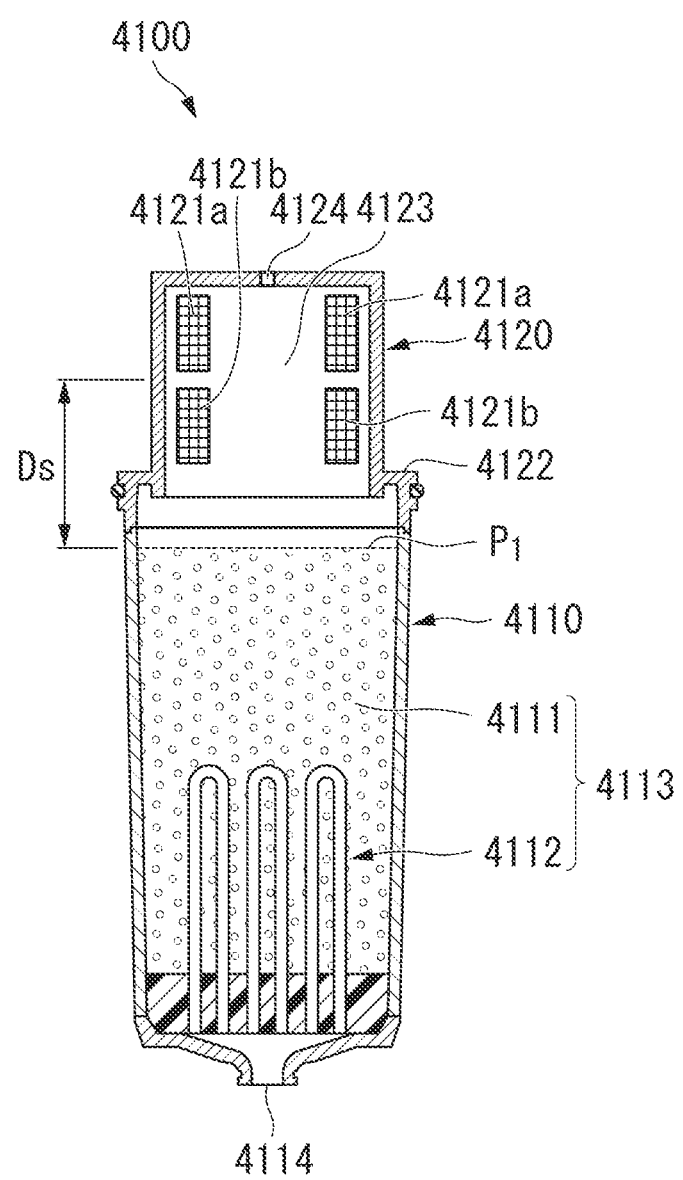
FIG. 15B is a longitudinal cross-sectional view illustrating one example of the water purifying cartridge in the related art.
Figure 16:
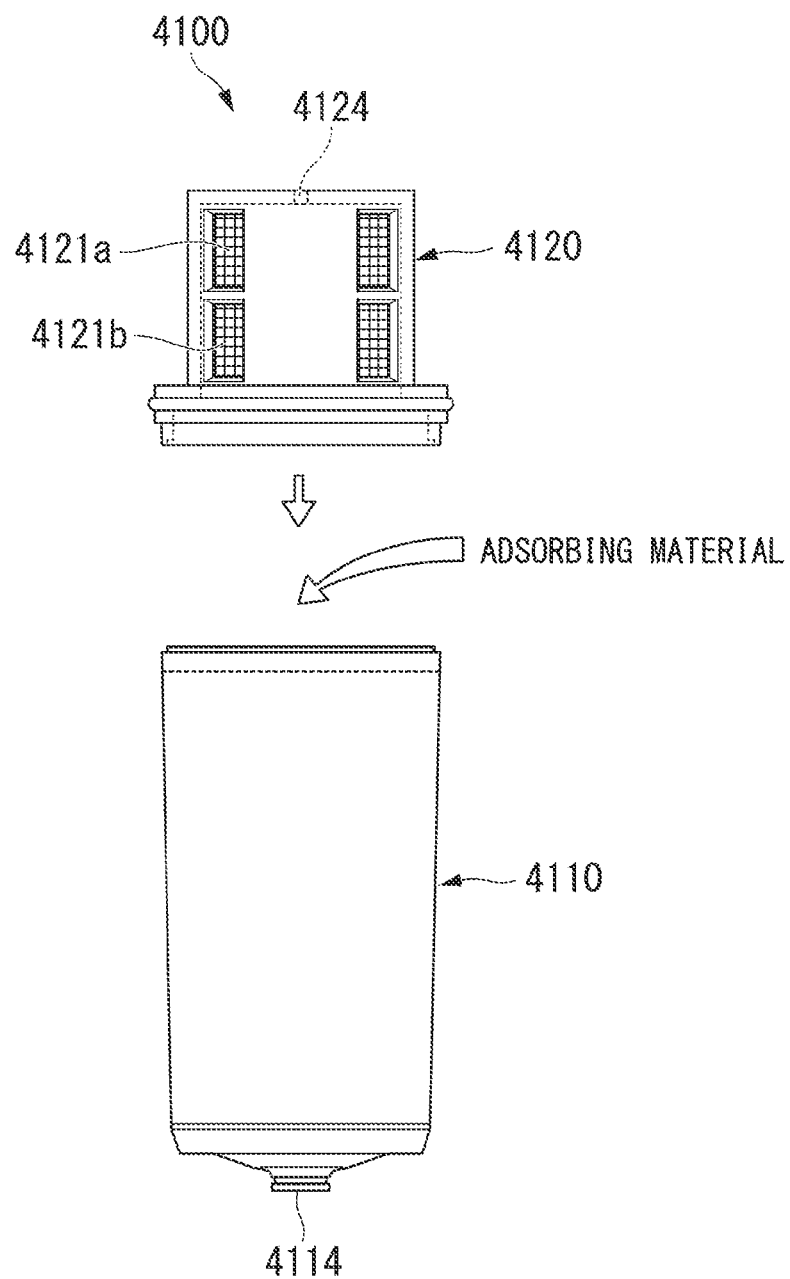
FIG. 16 is a front view illustrating a state before the housing lid and the housing body are welded to the water purifying cartridge of FIGS. 15A and 15B.

In the above described water purifying cartridge 410, the intake holes 432a and 432b for taking the water to be treated into the water purifying cartridge 410 is not formed in the housing lid but the peripheral wall of the housing body 430. As a result, when the adsorbing material is inputted from the opening of the top end 431 of the housing body 430 positioned above the intake holes 432a and 432b, the adsorbing material may be filled, for example, up to the vicinity of the height between the upper intake hole 432a and the lower intake hole 432b without any problem. In this regard, as illustrated in FIGS. 15A and 15B, when intake holes 4121a and 4121b are formed in a housing lid 4120, the top end of the housing body 4110 is positioned below the intake holes 4121a and 4121b, and as a result, the adsorbing material is inputted into the housing body 4110 from the top end. Therefore, it is difficult to fill the adsorbing material up to the vicinities of the intake holes 4121a and 4121b.

That is, in the water purifying cartridge 410 of FIGS. 12A and 12B, since the top end 431 of the housing body 430, which serves as a slot for inputting the adsorbing material is positioned above the intake holes 432a and 432b, the dead space may be reduced by filling the adsorbing material up to the height where the intake holes 432a and 432b are formed and filling efficiency of the water purification material 420 may be increased with respect to an inner volume of the water purifying cartridge 410.

When the filling efficiency is increased, even in the case in which a receiving capacity of the hollow fiber film is increased in order to increase a film area, the adsorbing material of a sufficient amount may be filled thereon and a filtration velocity of the water purifying cartridge may be improved while maintaining water purification performance without changing an outer shape or the size of the water purifying cartridge. Further, with the improvement of the filtration velocity of the hollow fiber film, even when more adsorbing materials are required to be filled, it is possible to fill more adsorbing materials.

Further, in the water purifying cartridge 4100 in the related art, which is illustrated in FIGS. 15A and 15B, a flange 4122 is provided in the housing lid 4120 in order to ultrasonically weld the housing body 4110 and the housing lid 4120, and as a result, the diameter of the upper part of the flange 4122 may not be smaller than that of the housing body 4110.

In this regard, in the case of the water purifying cartridge 410 of FIGS. 12A and 12B, since ultrasonic welding is not required below the intake holes 432a and 432b, the flange is provided or the diameter of the part where the intake holes 432a and 432b are formed need not be decreased thereby, as described above. As a result, more adsorbing materials may be filled.

Further, in the above example, as the water purification material 420, two water purification units of the film filtration water purification unit 421 and the adsorption water purification unit 422 positioned at an upstream side thereof are provided, but the configuration of the water purification material is not limited and one water purification unit may be configured or three or more water purification units may be configured. However, in the water purifying cartridge of the present invention, even a powdery or granular adsorbing material which is difficult to fill without causing the dead space may be filled with high filling efficiency at the uppermost stream side of the water purification material in the related art. Therefore, the water purifying cartridge of the present invention is more effective in the form in which the powdery or granular adsorbing material is provided at least at the uppermost stream side of the water purification material as illustrated in the examples of FIGS. 12A and 12B.

Further, the number of the formed intake holes, the positions of the intake holes, a placement pattern of the intake holes, and the like may be appropriately set as long as introduction of the water to be treated and treating of the introduced water to be treated by the water purification material are excellently performed.

In addition, the shape of the housing lid may be designed depending on a purpose, and the housing lid may be formed not particularly in a plate shape but in a tubular shape.

Besides, the ultrasonic welding is suitable for bonding of the housing body and the housing lid in that a bonding part is excellent in appearance and easy in operation, but the housing body and the housing lid may be bonded by other methods such as a method using an adhesive, and the like.

INDUSTRIAL APPLICABILITY

Since the pitcher-type water purifier of the present invention includes a pitcher body including a cylindrical casing having a bottom and a partition for partitioning the inside of the casing, a pitcher lid liquid-tightly closing an opened top end of the pitcher body, and a water purifying cartridge detachably attached to an opened attachment part in the partition, it is possible to enhance the impact resistance of the bottom of the casing of the water purifying cartridge and to increase the degree of freedom of the shape of the casing, thus being suitably used as the pitcher-type water purifier.

EXPLANATIONS OF LETTERS OR NUMERALS

10 PITCHER-TYPE WATER PURIFIER
20 PITCHER BODY
30 CASING
35 PERIPHERAL WALL
36 BOTTOM
37 TOP END
40 PARTITION
42 ATTACHMENT PART
50 PITCHER LID
51 LID BODY
52 DIAL BOARD
52a WINDOW
52c PROJECTION
58 CLAW
60 WATER PURIFYING CARTRIDGE
80 MARK
81 CONCAVE
410 WATER PURIFYING CARTRIDGE
420 WATER PURIFICATION MATERIAL
430 HOUSING BODY
431 TOP END OF HOUSING BODY
432a, 432b INTAKE HOLE
433 DISCHARGE HOLE
440 HOUSING LID
450 PITCHER-TYPE WATER PURIFIER

The invention claimed is:

1. A water purifying cartridge, comprising:
    a water purification material for treating water to be treated;
    a housing body in which the water purification material is directly received, a discharge hole discharging purified water is formed at a bottom, and a top end is opened;
    a plate-shaped housing lid provided at the top end of the housing body, and
    a film filtration water purification unit and an adsorption water purification unit,
    wherein the adsorption water purification unit is disposed at an upstream side of the film filtration water purification unit, and the adsorption water purification unit is configured by an adsorbing material that is directly filled in the housing body, and
    wherein the film filtration water purification unit is a hollow fiber film water purification unit.

2. The water purifying cartridge according to claim 1, wherein an intake hole for taking the water to be treated is formed on an upper peripheral wall of the housing body.

3. A pitcher-type water purifier comprising the water purifying cartridge of according to claim 1.

4. A pitcher-type water purifier, comprising:
a cylindrical casing having a bottom;
a pitcher body including a partition that partitions the inside of the casing;
a pitcher lid liquid-tightly closing an opened top end of the pitcher body; and
the water purifying cartridge according to claim 1 detachably attached to an opened attachment part in the partition.

5. The water purifying cartridge according to claim 1, wherein intake holes for taking the water to be treated into the water purifying cartridge are formed in the upper part of a peripheral wall of the housing body.

* * * * *